(12) United States Patent
Stevenson et al.

(10) Patent No.: US 11,100,456 B2
(45) Date of Patent: *Aug. 24, 2021

(54) SYSTEM AND METHOD FOR DETERMINING VOLUME OF FLUID IN A TANK

(71) Applicant: S1 Technologies, Inc., Gilmer, TX (US)

(72) Inventors: David L. Stevenson, Diana, TX (US); Sarah Bones, Scottsdale, AZ (US)

(73) Assignee: S1 Technologies, Inc., Gilmer, TX (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/421,432

(22) Filed: Jan. 31, 2017

(65) Prior Publication Data

US 2017/0154301 A1 Jun. 1, 2017

Related U.S. Application Data

(63) Continuation-in-part of application No. 15/391,813, filed on Dec. 27, 2016, which is a
(Continued)

(51) Int. Cl.
*G06Q 10/08* (2012.01)
*G01F 23/14* (2006.01)
(Continued)

(52) U.S. Cl.
CPC ........... *G06Q 10/087* (2013.01); *G01F 22/02* (2013.01); *G01F 23/0076* (2013.01);
(Continued)

(58) Field of Classification Search
CPC ......... G05B 15/02; G01F 1/007; G01F 23/14; G01F 23/16; G01F 23/18; Y02T 10/36
See application file for complete search history.

(56) References Cited

U.S. PATENT DOCUMENTS 4,570,484 A 2/1986 Sokalski
4,625,548 A * 12/1986 Charter .................. G01F 23/16
73/299

(Continued)

FOREIGN PATENT DOCUMENTS

CA 2753588 A1 3/2013
WO 2013/140375 A2 9/2013

OTHER PUBLICATIONS https://www.ogj.com/articles/print/volume-88/issue-20/in-this-issue/refining/hydrostatic-tank-gauges-accurately-measure-mass-volume-and-level.html (Year: 1990).*

(Continued)

*Primary Examiner* — Ariel J Yu
*Assistant Examiner* — Dana Amsdell
(74) *Attorney, Agent, or Firm* — Jack D. Stone, Jr.; Scheef & Stone, L.L.P.

(57) ABSTRACT

Volume of a fluid, such as gasoline or diesel fuel, in a tank is determined by measuring the pressure of the fluid using a pressure sensor positioned proximate the bottom of the tank. The depth of the fluid in the tank is then calculated by dividing the pressure by the density of the fluid. Fluid volume is then determined mathematically or from charts given the depth as well as the size and shape of the tank. Multiple pressure readings may be taken along or near the bottom of a tank, and an average pressure determined that may be used to calculate measured volume. To maintain accuracy at different altitudes, pressure readings are preferably adjusted for atmospheric pressure using differential pressure sensors or a processor using data indicative of both pressures. Volume changes exceeding a predetermined threshold, or which are not comparable to dispensed fuel, may be flagged and alerts generated.

28 Claims, 26 Drawing Sheets

Related U.S. Application Data continuation-in-part of application No. 14/529,137, filed on Oct. 30, 2014, now Pat. No. 9,528,872, and a continuation-in-part of application No. 14/529,118, filed on Oct. 30, 2014, now Pat. No. 9,557,207.

(60) Provisional application No. 61/897,426, filed on Oct. 30, 2013.

(51) Int. Cl.
| | | |
|---|---|---|
| *G06Q 20/40* | (2012.01) | |
| *G01F 23/00* | (2006.01) | |
| *G06Q 20/08* | (2012.01) | |
| *H04Q 9/02* | (2006.01) | |
| *G07C 5/00* | (2006.01) | |
| *G01F 22/02* | (2006.01) | |
| *G07F 13/02* | (2006.01) | |
| *G07C 5/08* | (2006.01) | |

(52) U.S. Cl.
CPC ............ *G01F 23/14* (2013.01); *G06Q 20/085* (2013.01); *G06Q 20/4016* (2013.01); *G07C 5/008* (2013.01); *G07F 13/025* (2013.01); *H04Q 9/02* (2013.01); *G07C 5/085* (2013.01)

(56) References Cited

U.S. PATENT DOCUMENTS

| | | | |
|---|---|---|---|
| 4,625,553 A * | 12/1986 | Charter | G01N 9/26 73/438 |
| 4,843,883 A | 7/1989 | Glover et al. | |
| 5,167,155 A | 12/1992 | Rodgers | |
| 5,303,842 A | 4/1994 | Harp et al. | |
| 5,333,498 A | 8/1994 | Brackett et al. | |
| 5,351,725 A * | 10/1994 | Suthergreen | G01F 1/007 141/1 |
| 5,400,253 A | 3/1995 | O'Connor | |
| 5,665,895 A | 9/1997 | Hart et al. | |
| 5,701,863 A | 12/1997 | Cemenska et al. | |
| 5,829,418 A | 11/1998 | Tamura et al. | |
| 6,003,379 A | 12/1999 | Ichikawa et al. | |
| 6,085,805 A | 7/2000 | Bates | |
| 6,282,953 B1 | 9/2001 | Benjey | |
| 6,463,389 B1 | 10/2002 | Dickson | |
| 6,568,424 B1 | 5/2003 | Galad et al. | |
| 6,618,362 B1 | 9/2003 | Terranova | |
| 6,907,780 B1 | 6/2005 | Meagher | |
| 6,935,191 B2 | 8/2005 | Olivier et al. | |
| 7,028,561 B2 | 4/2006 | Robertson et al. | |
| 7,032,449 B2 * | 4/2006 | Rivas P. | G01N 9/26 73/299 |
| 7,689,371 B2 | 3/2010 | Memmott et al. | |
| 8,116,993 B2 * | 2/2012 | Cebulski | G01F 11/00 702/55 |
| 8,370,088 B2 | 2/2013 | Ammouri et al. | |
| 9,347,848 B1 * | 5/2016 | Westmoreland | G01F 23/0076 |
| 9,939,305 B2 * | 4/2018 | Tetil | G01F 23/0069 |
| 2002/0184942 A1 | 12/2002 | Isobe et al. | |
| 2003/0168413 A1 * | 9/2003 | Brett | B01D 37/046 210/791 |
| 2004/0007215 A1 * | 1/2004 | Kawano | F02M 25/08 123/520 |
| 2004/0023087 A1 | 2/2004 | Redmond | |
| 2004/0089371 A1 | 5/2004 | Few | |
| 2005/0096836 A1 | 5/2005 | Minami et al. | |
| 2005/0224055 A1 * | 10/2005 | Wiese | F02D 41/0025 123/494 |
| 2005/0273218 A1 | 12/2005 | Breed et al. | |
| 2006/0032548 A1 * | 2/2006 | Cuppies | G01F 23/164 141/95 |
| 2006/0065324 A1 | 3/2006 | Ferreira et al. | |
| 2006/0111851 A1 | 5/2006 | Potgieter et al. | |
| 2006/0266111 A1 | 11/2006 | Gourlay et al. | |
| 2007/0079804 A1 | 4/2007 | Nakayama | |
| 2007/0250452 A1 | 10/2007 | Leigh et al. | |
| 2007/0251509 A1 | 11/2007 | Nakano et al. | |
| 2008/0185326 A1 * | 8/2008 | Serafin | B01D 29/908 210/186 |
| 2008/0209990 A1 | 9/2008 | Hanari et al. | |
| 2008/0213874 A1 | 9/2008 | Mitchell et al. | |
| 2008/0271516 A1 | 11/2008 | Hewitt | |
| 2008/0303663 A1 | 12/2008 | Smith et al. | |
| 2008/0319605 A1 | 12/2008 | Davis | |
| 2010/0205072 A1 | 8/2010 | Dixon et al. | |
| 2011/0056274 A1 | 3/2011 | Bunod et al. | |
| 2011/0140877 A1 | 6/2011 | Gilchrist et al. | |
| 2012/0156579 A1 | 6/2012 | Yabutani | |
| 2012/0232750 A1 | 9/2012 | Leigh | |
| 2012/0296549 A1 | 11/2012 | Adams | |
| 2013/0197777 A1 | 8/2013 | Sloan et al. | |
| 2013/0220013 A1 | 8/2013 | Fitz | |
| 2013/0297178 A1 * | 11/2013 | Hill | F02M 25/0818 701/102 |
| 2013/0306656 A1 | 11/2013 | Eckhoff et al. | |
| 2014/0129426 A1 | 5/2014 | Lamb et al. | |
| 2014/0196537 A1 | 7/2014 | Park | |
| 2014/0223992 A1 | 8/2014 | Harper et al. | |
| 2014/0236444 A1 | 8/2014 | Stefan et al. | |
| 2014/0263629 A1 | 9/2014 | McQuade et al. | |
| 2014/0279535 A1 | 9/2014 | Fadler | |
| 2015/0013451 A1 | 1/2015 | Van Der Linde et al. | |
| 2015/0082877 A1 | 3/2015 | Weil et al. | |

OTHER PUBLICATIONS www.chm.davidson.edu/vce/gaslaws/boyleslawcalc.html.
www.calculatoredge.com/chemical/combined%20gas%20law.htm.
Artificial Intelligent Smart and Multi Detection System for Leakage Detection of Landfill, Lagoon, Pond, Lake, and Storage Tank (0711). Retrieved from http://dialog.proquest.com/professional/docview/1189717739?accountid=161361.

* cited by examiner

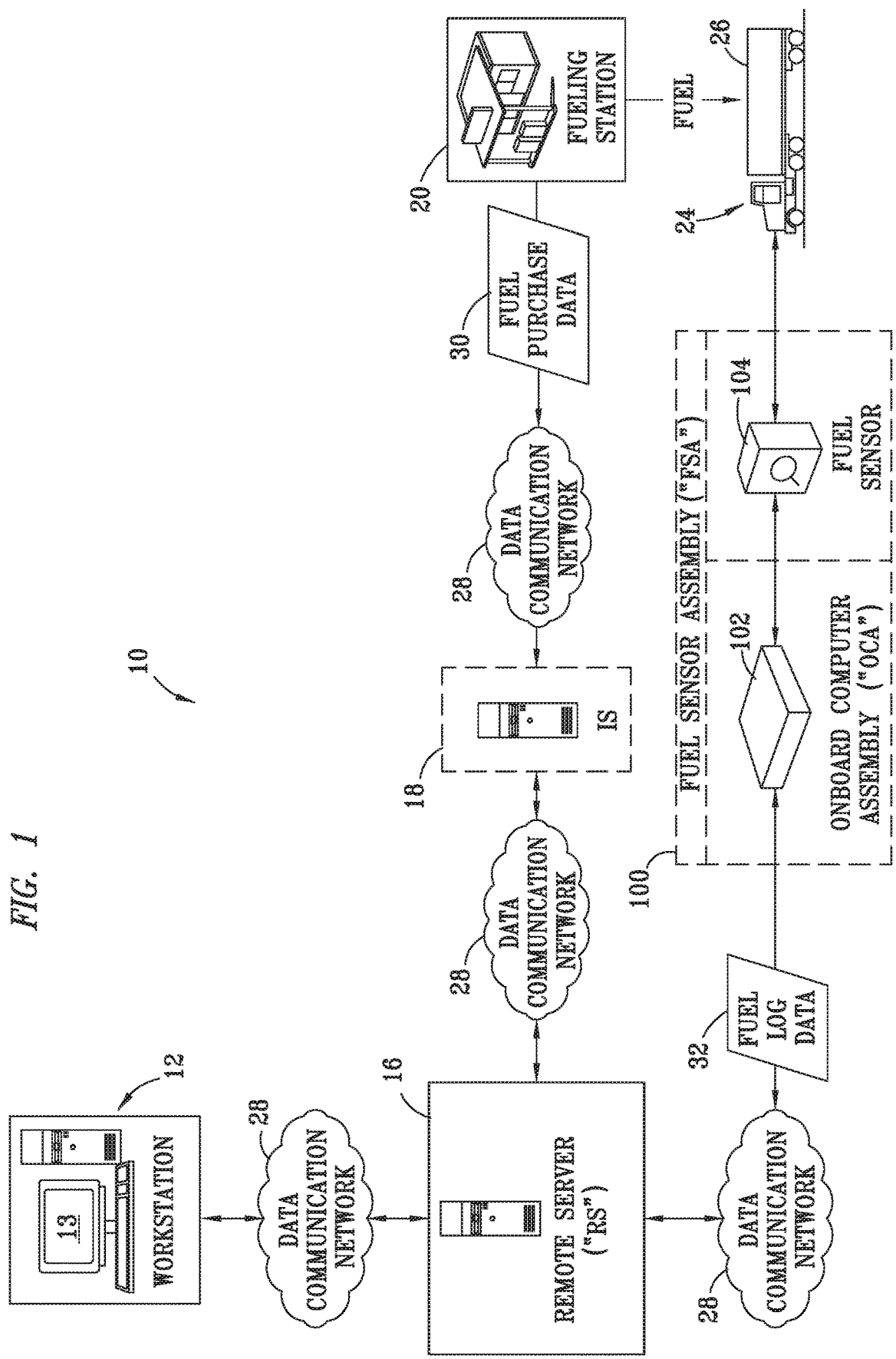

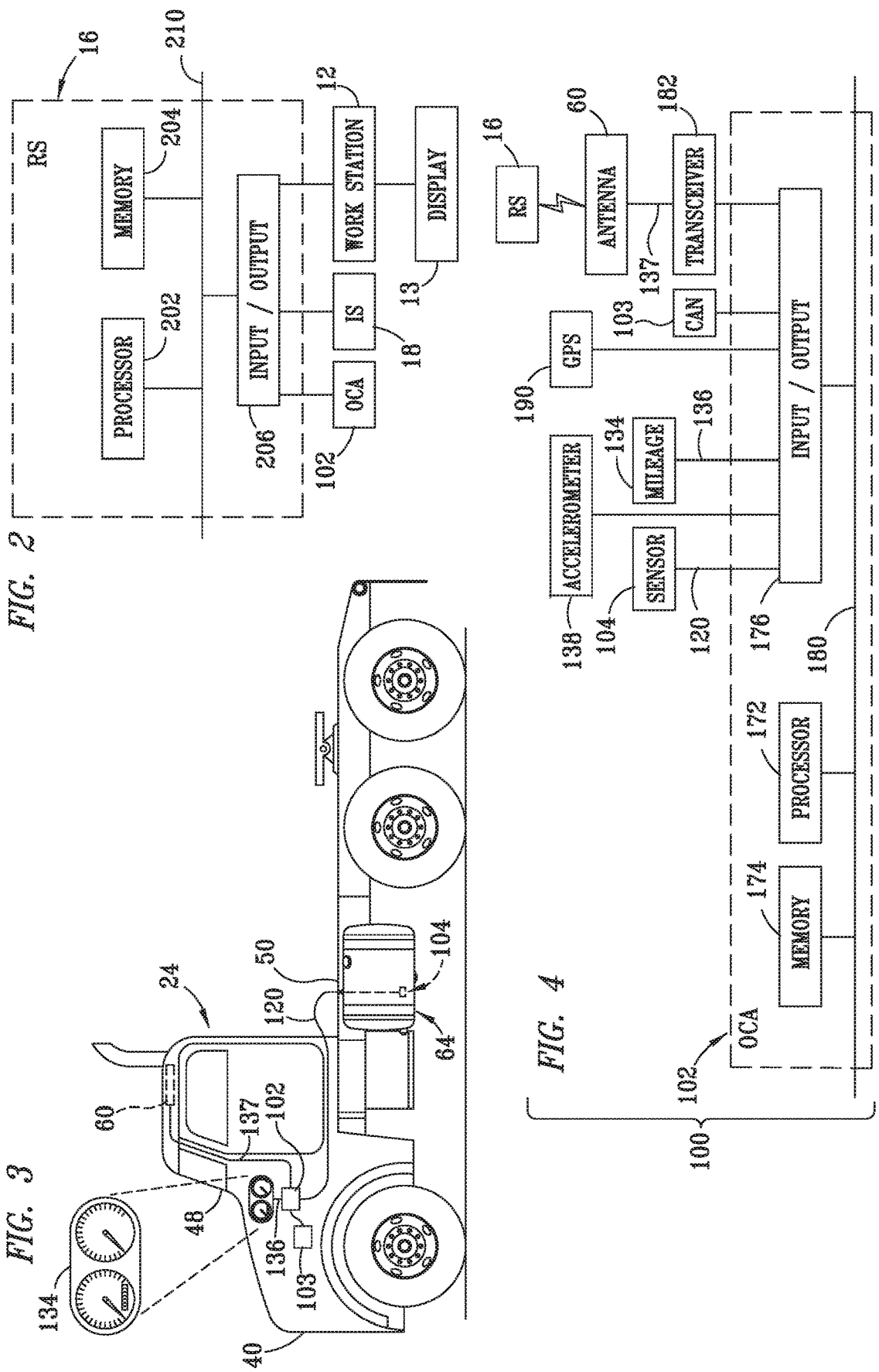

USER ACCESS CONFIGURATION
ADMINISTER USER ACCESS RIGHTS AND CREDENTIALS.

CREATE NEW USER

| USERNAME | FULL NAME | EMAIL | ACCESS GROUP | LAST LOGIN DATA |
|---|---|---|---|---|
| JDOE | JOHN DOE | john@gmail.com | SYSTEMADMIN | 2014-10-15 15:17:52 |
| MJOPLIN | MIKE JOPLIN | mike@gmail.com | SYSTEMADMIN | 2014-10-17 07:49:51 |
| BBROWN | BILL BROWN | bill@gmail.com | SYSTEMADMIN | 2014-10-15 15:13:12 |
| TSMITH | TREVOR SMITH | trevor@gmail.com | SYSTEMADMIN | 2014-07-07 13:04:38 |
| TJONES | TOM JONES | tom@gmail.com | VIEWER | 0000-00-00 00:00:00 |
| SSCOTT | SUE SCOTT | sue@gmail.com | SYSTEMADMIN | 2014-10-16 22:56:04 |
| KTURNER | KELLY TURNER | kelly@gmail.com | VIEWER | 2014-09-25 18:22:30 |
| DWEST | DAVID WEST | david@gmail.com | VIEWER | 2014-10-16 18:24:50 |

EXPORT AND SHARE
SELECT A REPORT TYPE BELOW TO DOWNLOAD AND SAVE THE REPORT
OR ENTER AN EMAIL ADDRESS BELOW TO SEND AND SHARE.

SAVE  PRINT

EMAIL ADDRESS
SEND TO MULTIPLE ADDRESSES BY SEPARATING
THEM WITH COMMAS.

EMAIL

RPT ▼ LOGS ▼ CONFIG ▼ HELP ▼
DASHBD LOG OUT
READER

FIG. 10

FUEL PURCHASE RECONCILIATIONS REPORT
VIEW ALL FUELING EVENTS RECORDED FOR TODAY, OR SEARCH FOR A SPECIFIED DATE RANGE.

DATE RANGE: 09/17/2014 – 10/17/2014

| DATE | TIME | UNIT | DRIVER NAME | CARD # | INVOICE # | FUEL LOCATION | CITY | ST | GALS PURCH | RETAIL PPG | PURCH AMOUNT | GALLONS LOGGED | DIFF |
|---|---|---|---|---|---|---|---|---|---|---|---|---|---|
| 2014-09-17 | 22:38 | 244 | | **__**_4431 | 728553 | QUIK TRIP #873 | FT. WORTH | TX | 169.18 | 3.45 | 583.49 | 156.38 | -12.80 |
| 2014-09-17 | 11:02 | 195 | | **__**_4480 | 561268 | LOVES #273 | WEATHERFORD | TX | 113.88 | 3.26 | 431.51 | 85.73 | -28.15 |
| 2014-09-17 | 9:02 | 247 | | **__**_4449 | 437473 | QUIK TRIP #970 | DALLAS | TX | 138.33 | 3.50 | 484.01 | 134.66 | -3.67 |
| 2014-09-18 | 12:20 | 195 | | **__**_4480 | 575443 | QUIK TRIP #475 | SWEETWATER | TX | 125.90 | 3.31 | 477.04 | 100.34 | -25.56 |
| 2014-09-18 | 12:59 | 243 | | **__**_4415 | 586871 | LOVES #270 | RANGER | TX | 179.10 | 3.28 | 678.62 | | -6.17 |
| 2014-09-18 | 11:12 | 246 | | **__**_4469 | 555756 | LOVES #270 | ROCKWALL | TX | 126.00 | 3.26 | 477.41 | 126.45 | 0.45 |
| 2014-09-19 | 10:34 | 241 | | **__**_4365 | 552133 | LOVES #273 | WEATHERFORD | TX | 95.00 | 3.25 | 359.98 | 80.88 | -5.12 |
| 2014-09-19 | 16:30 | 247 | | **__**_4449 | 661542 | QUIK TRIP #970 | DALLAS | TX | 140.94 | 3.40 | 479.06 | 139.00 | -7.43 |
| 2014-09-20 | 7:01 | 244 | | **__**_4431 | 339807 | QUIK TRIP #970 | DALLAS | TX | 82.53 | 3.40 | 280.52 | 75.10 | -7.43 |
| 2014-09-20 | 20:37 | 243 | | **__**_4415 | 597139 | LOVES #283 | ROCKWALL | TX | 126.00 | 3.26 | 477.41 | 126.45 | 0.45 |
| 2014-09-21 | 8:31 | 195 | | **__**_4480 | 24546 | LOVES #294 | DALLAS | TX | 104.61 | 3.21 | 396.40 | 80.95 | -23.66 |
| 2014-09-21 | 11:56 | 246 | | **__**_4969 | 67624 | LOVES #283 | ROCKWALL | TX | 89.00 | 3.21 | 337.22 | 90.43 | 1.43 |

FIG. 11  244

VEHICLE FUEL
VIEW LATEST FUEL REPORTS FROM UNITS.

| DATE AND TIME | UNIT | GALLONS | TANK 1 TEMP | TANK 2 TEMP |
|---|---|---|---|---|
| 2014-10-17 20:48:57 | 246 | 105.71 | -6 | 81 |
| 2014-10-17 20:48:04 | 244 | 71.71 | 95 | 91 |
| 2014-10-17 20:47:58 | 195 | 188.64 | 81 | 81 |
| 2014-10-17 20:42:38 | 243 | 61.55 | 82 | 82 |
| 2014-10-17 20:42:27 | 370 | 168.57 | 84 | 77 |
| 2014-10-17 20:31:38 | 241 | 213.38 | 86 | 86 |
| 2014-10-17 20:17:05 | 242 | 100.90 | 32 | 52 |
| 2014-10-17 19:55:58 | 247 | 100.90 | 79 | 79 |
| 2014-10-17 16:39:53 | 999 | 39.58 | -22 | 70 |
| 2014-10-16 14:33:04 | 192 | 53.83 | 136 | 77 |
| 2014-09-18 10:27:44 | 190 | 19.62 | 79 | 79 |
| 2014-06-26 16:55:09 | 1234 | 0.24 | 75 | 73 |

EXPORT AND SHARE
SELECT A REPORT TYPE BELOW TO DOWNLOAD AND SAVE THE REPORT OR ENTER
AN EMAIL ADDRESS BELOW TO SEND AND SHARE.

SAVE  PRINT

EMAIL ADDRESS
SEND TO MULTIPLE ADDRESSES BY SEPARATING THEM WITH COMMAS.

EMAIL

FIG. 12 246

FUEL LOSS EVENTS
VIEW LATEST FUEL LOSS EVENTS FROM UNITS.

| UNIT | DATE | TIME | GPS LAT/LON | GALLONS LOST |
|---|---|---|---|---|
| 242 | 2014-10-17 | 08:46:45 | 3129.3120,09712.3479 | -12.05 |
| 242 | 2014-10-18 | 02:13:53 | 3248.2077,09652.1291 | -12.92 |
| 244 | 2014-10-15 | 19:26:10 | 3243.2369,09720.7182 | -17.63 |
| 242 | 2014-10-15 | 08:55:22 | 3227.2461,09940.0818 | -29.68 |
| 241 | 2014-10-15 | 08:41:08 | 3248.2049,09652.1252 | -38.67 |
| 192 | 2014-10-15 | 09:02:14 | 3243.9220,09456.8701 | -28.14 |
| 242 | 2014-10-14 | 13:02:34 | 3244.1177,09719.5880 | -19.98 |
| 244 | 2014-10-14 | 08:32:39 | 2927.4390,09831.0849 | -17.53 |
| 192 | 2014-10-12 | 18:58:54 | | -28.89 |
| 195 | 2014-10-12 | 12:23:50 | 3243.9187,09456.8734 | -11.14 |
| 195 | 2014-10-11 | 15:44:45 | 3243.9181,09456.8707 | -13.75 |
| 242 | 2014-10-10 | 16:26:45 | 3240.6492,09703.4899 | -31.31 |
| 195 | 2014-10-10 | 10:56:04 | 3243.9204,09458.8292 | -11.20 |
| 192 | 2014-10-10 | 10:52:34 | | -33.68 |
| 195 | 2014-10-08 | 17:11:24 | 3227.6322,09439.7649 | -17.15 |
| 192 | 2014-10-08 | 18:48:02 | 3227.6322,09439.7649 | -36.54 |
| 195 | 2014-10-08 | 15:41:18 | 3227.6322,09439.7809 | -71.81 |
| 242 | 2014-10-06 | 08:35:08 | 3130.0999,09710.4200 | -11.33 |
| 242 | 2014-10-06 | 08:12:21 | 3130.0999,09710.4200 | -16.02 |
| 242 | 2014-10-06 | 08:35:08 | 3130.0999,09710.4200 | -11.33 |
| 242 | 2014-10-06 | 08:12:21 | 3130.0999,09710.4200 | -16.02 |
| 243 | 2014-10-02 | 16:17:36 | 3241.3317,09649.7306 | -17.83 |
| 244 | 2014-10-02 | 11:08:32 | 3241.6272,09814.8277 | -10.81 |
| 242 | 2014-09-29 | 05:54:07 | 3223.0627,09922.2520 | -19.63 |

FIG. 13

DAILY FUEL LOGS
VIEW ALL RAW FUEL PROBE LOGS RECORDED FOR TODAY, OR SEARCH FOR A SPECIFIED DATE RANGE.

DATE RANGE: 10/10/2014 – 10/17/2014

| DATE | TIME | UNIT | GALLONS LOGGED | TANK 1 TEMP | TANK 2 TEMP |
|---|---|---|---|---|---|
| 2014-10-10 | 02:24:16 | 244 | 1.31 | 115 | 108 |
| 2014-10-10 | 06:24:27 | 242 | 13.02 | 32 | 54 |
| 2014-10-10 | 07:36:37 | 241 | 2.30 | 111 | 115 |
| 2014-10-10 | 08:03:38 | 241 | -1.83 | 115 | 118 |
| 2014-10-10 | 09:58:55 | 242 | 10.99 | 32 | 52 |
| 2014-10-10 | 10:52:34 | 192 | -33.68 | 142 | 81 |
| 2014-10-10 | 10:07:00 | 242 | 27.32 | 32 | 52 |
| 2014-10-10 | 10:44:19 | 242 | 117.71 | 32 | 66 |
| 2014-10-10 | 10:17:59 | 244 | -3.33 | 109 | 102 |
| 2014-10-10 | 11:13:59 | 192 | 35.58 | 151 | 95 |
| 2014-10-10 | 11:22:00 | 192 | 19.99 | 156 | 100 |
| 2014-10-10 | 10:56:04 | 195 | -11.20 | 131 | 133 |
| 2014-10-10 | 11:31:03 | 243 | -3.94 | 86 | 115 |
| 2014-10-10 | 13:16:58 | 241 | 2.90 | 111 | 115 |
| 2014-10-10 | 13:57:35 | 241 | 6.60 | 108 | 109 |
| 2014-10-10 | 13:04:36 | 242 | 10.26 | 32 | 86 |
| 2014-10-10 | 13:08:27 | 242 | 10.16 | 32 | 86 |
| 2014-10-10 | 13:34:11 | 242 | 36.25 | 32 | 64 |
| 2014-10-10 | 14:57:00 | 241 | -3.47 | 117 | 122 |
| 2014-10-10 | 15:31:51 | 242 | 10.99 | 32 | 68 |
| 2014-10-10 | 16:26:46 | 242 | -31.31 | 32 | 63 |
| 2014-10-10 | 15:17:11 | 244 | 151.25 | 97 | 93 |
| 2014-10-10 | 16:12:21 | 243 | -4.92 | 118 | 122 |

FIG. 14  250

FUEL PURCHASE LOGS
VIEW ALL RAW FUEL PURCHASE TRANSACTION LOGS RECORDED FOR TODAY, OR SEARCH FOR A SPECIFIC DATE RANGE.

DATE RANGE: 10/10/2014 – 10/17/2014

| DATE | TIME | UNIT | INVOICE # | GALLONS PURCH | PURCH AMT | RETAIL PPG | CARD # | FUELING LOCATION | CITY | ST |
|---|---|---|---|---|---|---|---|---|---|---|
| 2014-10-10 | 8:05 | 710 | 390958 | 153.87 | 576.87 | 3.12 | **__**_4787 | LOVES #287 | VAN | TX |
| 2014-10-10 | 4:14 | 739 | 561268 | 141.51 | 530.55 | 3.13 | **__**_4712 | LOVES #450 | WEST MEMPHIS | AR |
| 2014-10-10 | 4:14 | 700 | 57667 | 100.01 | 369.95 | 3.70 | **__**_4514 | KENT TIMEOUT TR | ALAMOGORDO | NM |
| 2014-10-10 | 3:19 | 229 | 57642 | 159.03 | 546.90 | 3.16 | **__**_5123 | LOVES #254 | MOORESVILLE | IN |
| 2014-10-10 | 10:39 | 263 | 553837 | 181.08 | 675.27 | 3.16 | **__**_4829 | LOVES #307 | JACKSON | GA |
| 2014-10-10 | 1:58 | 193 | 19004 | 119.18 | 439.66 | 3.10 | **__**_4484 | LOVES #288 | FAIRFIELD | TX |
| 2014-10-10 | 17:07 | 237 | 6759996 | 90.00 | 316.71 | 3.52 | **__**_4753 | WHITE OAK TRUCK | HARRISON | AR |
| 2014-10-10 | 9:28 | 747 | 496417 | 102.02 | 385.54 | 3.33 | **__**_4662 | LOVES #246 | FERNLEY | NV |
| 2014-10-10 | 6:59 | 713 | 371657 | 57.16 | 199.48 | 3.28 | **__**_5024 | LOVES #303 | WADDY | KY |
| 2014-10-10 | 15:04 | 244 | 673361 | 152.99 | 573.56 | 3.09 | **__**_4431 | LOVES #209 | GREENWOOD | LA |
| 2014-10-10 | 15:35 | 708 | 647668 | 109.30 | 376.98 | 3.14 | **__**_5198 | LOVES #222 | RICHMOND | IN |
| 2014-10-10 | 14:58 | 702 | 635487 | 137.59 | 518.22 | 3.10 | **__**_1472 | LOVES #283 | ROCKWALL | TX |

FIG. 15A 252

FUEL PROBE CONFIGURATION
SELECT A PROBE OR GROUP TO MANAGE ITS PROPERTIES, OR CONFIGURE A NEW PROBE OR GROUP.

GROUP: [ALL]
PROBE: [SELECT PROBE]

CONFIGURATION PROPERTIES

UNIT [ ]  GROUP [GROUP 1]
PRODUCT CODE [REDACTED]
IP ADDRESS [ ]
STATUS UPDATE TIME (IN HOURS) [ ]
PRESSURE STEADY COUNT [ ]
LOG TIME INTERVAL (IN SECONDS) [ ]
X CHANGE [ ]  Y CHANGE [ ]  Z CHANGE [ ]
ESTARTTRIG [ ]  ESTOPTRIG [ ]  ESAMPLES [ ]
ECHANGETRIG [ ]  ESTEADYCLEAR [ ]

TANK PROPERTIES

TANK 1
TANK SIZE [ ]  PRESSURE WHEN FULL [ ]
PRESSURE PER INCH [ ]  PRESSURE ADJUST [ ]
TEMPERATURE CALIBRATION [ ]

TANK 2
TANK SIZE [ ]  PRESSURE WHEN FULL [ ]
PRESSURE PER INCH [ ]  PRESSURE ADJUST [ ]
TEMPERATURE CALIBRATION [ ]

TANK 3
TANK SIZE [ ]  PRESSURE WHEN FULL [ ]
PRESSURE PER INCH [ ]  PRESSURE ADJUST [ ]
TEMPERATURE CALIBRATION [ ]

REPT | LOGS | CONFIG | HELP
DASHBD | LOG OUT

FUELCHEK REPORT CONFIGURATION
CREATE, CUSTOMIZE AND MANAGE YOUR FUELCHEK REPORTING.
SELECT A REPORT: CRITICAL EVENTS - PAST WEEK

REPORT DATA ELEMENTS

SELECT WHICH DATA ELEMENTS
TO INCLUDE IN REPORT.

- ☒ PURCHASED
- ☐ UNIT
- ☒ GALLONS
- ☒ DATE
- ☐ TIME
- ☒ DRIVER
- ☒ CARD
- ☐ CITY
- ☐ ST
- ☒ PPG
- ☒ LOGVAL
- ☒ DIFFERENCE
- ☐ TEMP1
- ☐ TEMP2
- ☐ TIMEZONE

REPORT PROPERTIES

REPORT NAME
CRITICAL EVENTS - PAST WEEK

DESCRIPTION OF REPORT
2ND TEST

YESTERDAY

START DATE
0000-00-00

END DATE
0000-00-00

GROUP BY
PPG

SUM FIELD

DISPLAY IN DASHBOARD: NO

GALLONS FILTER
PURCHASE GALLONS GREATER THAN:
0.00

LOG VALUE GREATER THAN:
0

DIFFERENCE GREATER THAN:
0.99

REPT | LOGS | CONFIG | HELP
DASHBD | LOG OUT | C | READER

FIG. 18A 258

ALERTS CONFIGURATION
MANAGE REAL TIME ALERTMENT FROM UNITS

REPORTS | ▼ | LOGS | ▼ | CONFIGURE | ▼ | HELP | ▼

| NAME | DESCRIPTION | TYPE | THRESHOLD | EMAIL ADDRESS | PRODUCTS | GROUP | UNITS |
|---|---|---|---|---|---|---|---|
| ALERT 4 | LOSS >10 GALLONS | FUELLOSS | 10 | JOHN@GMAIL.COM | --REDACTED-- | | 1234 |
| FUEL LOSS ALL TRUCKS | LOSS >10 GALLONS | FUELLOSS | 10 | MARY@GMAIL.COM | --REDACTED-- | | 190, 195, 192, 241, 243, 244, 246, 247, 370, 999 |
| TEMP ALERTS | TEMP <32 | FUELTEMPERATURE | 32 | TOM@GMAIL.COM | --REDACTED-- | | 190, 192, 195, 241, 243, 244, 246, 247, 370, 999 |
| TEST FL | ANOTHER TEST | FUELLOSS | 100 | BRUCE@GMAIL.COM | --REDACTED-- | | |
| TEMP ALERT | TEMPERATURE <20 DEG | FUELTEMPERATURE | 20 | BILL@GMAIL.COM | --REDACTED-- | 1 | 244, 247, 1234 |

MANAGE ALERTS

SELECT AN ALERT TO MANAGE IT'S PROPERTIES, OR CONFIGURE A NEW ALERT.

SELECT AN ALERT: ALERT 4

ALERT TYPE: FUEL LOSS

ALERT NAME
ALERT 4

ALERT DESCRIPTION
LOSS >10 GALLONS

FIG. 19 260

PRODUCT CONFIGURATION
MANAGE PRODUCT TYPES.

PRODUCT CODE | DESCRIPTION
--REDACTED-- | --REDACTED--
--REDACTED-- | LAB TEST UNIT
--REDACTED-- | VERSION 1 PROTOTYPE

MANAGE PRODUCTS
SELECT A PRODUCT TO MANAGE ITS PROPERTIES, OR ADD A NEW PRODUCT.
SELECT A PRODUCT: ACUTRAC1

PRODUCT CODE
--REDACTED--
DESCRIPTION OF PRODUCT
--REDACTED--

SAVE | MODIFY | DELETE

EXPORT AND SHARE
SELECT A REPORT TYPE BELOW TO DOWNLOAD AND SAVE THE REPORT OR ENTER AN EMAIL ADDRESS BELOW TO SEND AND SHARE.

EMAIL ADDRESS
SEND TO MULTIPLE ADDRESSES BY SEPARATING THEM WITH COMMAS.

SAVE | PRINT

EMAIL

FIG. 20 262

FIRMWARE UPDATES
MANAGE FIRMWARE AND TANK TABLE UPDATES.

UPDATE PRODUCTS
☑ -REDACTED-
☑ -REDACTED-
☑ -REDACTED-

SELECT FIRMWARE AND OPTIONS

OPTIONALLY LIMIT TO A SINGLE GROUP:
GROUP: [ALL] ◊

OPTIONALLY LIMIT TO SPECIFIC UNIT NUMBERS.
SEPARATE MULTIPLE NUMBERS WITH COMMAS.
UNITS

SELECT FIRMWARE TO BE APPLIED.
SELECT FIRMWARE: -REDACTED- ◊
UPDATE FIRMWARE

SELECT NEW TANK TABLE.
TANK TABLE: -REDACTED- ◊
UPDATE TANK 1 | UPDATE TANK 2 | UPDATE TANK 3

EMAIL ADDRESS
SEND TO MULTIPLE ADDRESSES BY
SEPARATING THEM WITH COMMAS.

EMAIL

EXPORT AND SHARE
SELECT A REPORT TYPE BELOW TO DOWNLOAD AND SAVE THE REPORT
ENTER AN EMAIL ADDRESS BELOW TO SEND AND SHARE.

SAVE | PRINT

REPT ▼ | LOGS ▼ | CONFIG ▼ | HELP ▼
DASHBD | LOG OUT
READER

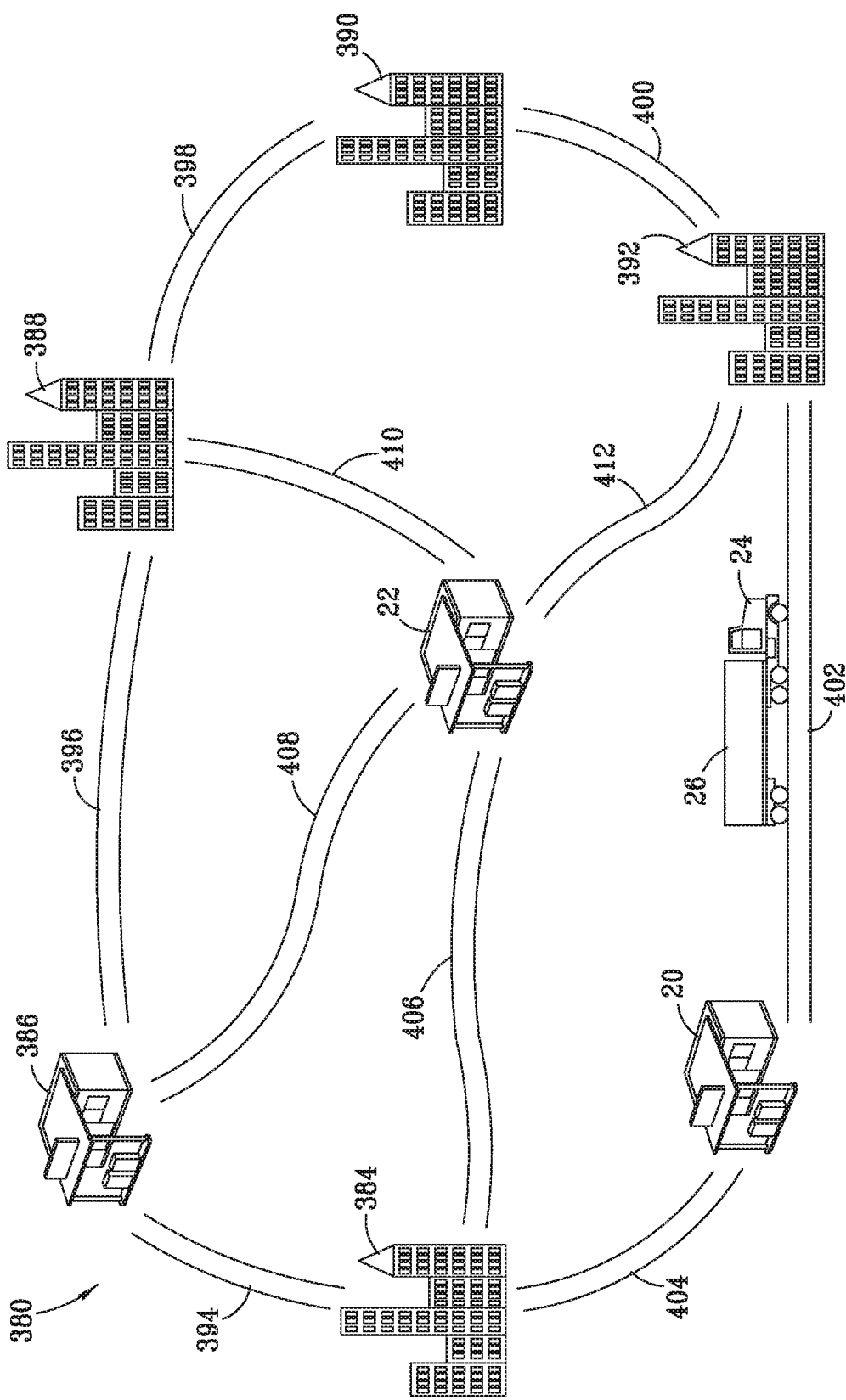

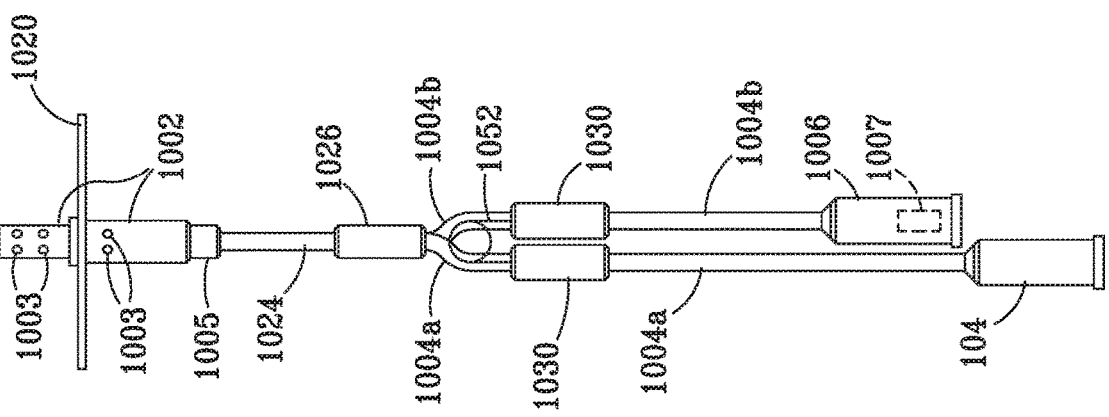
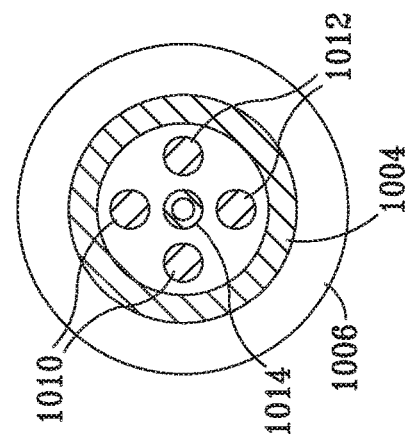
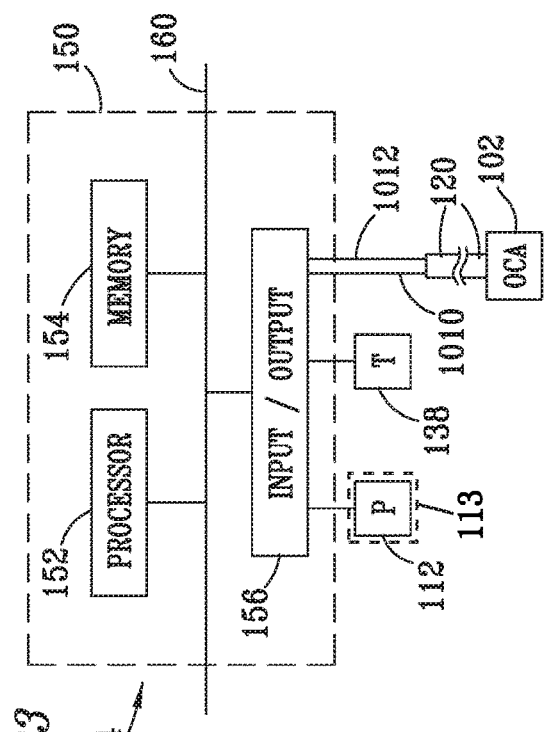
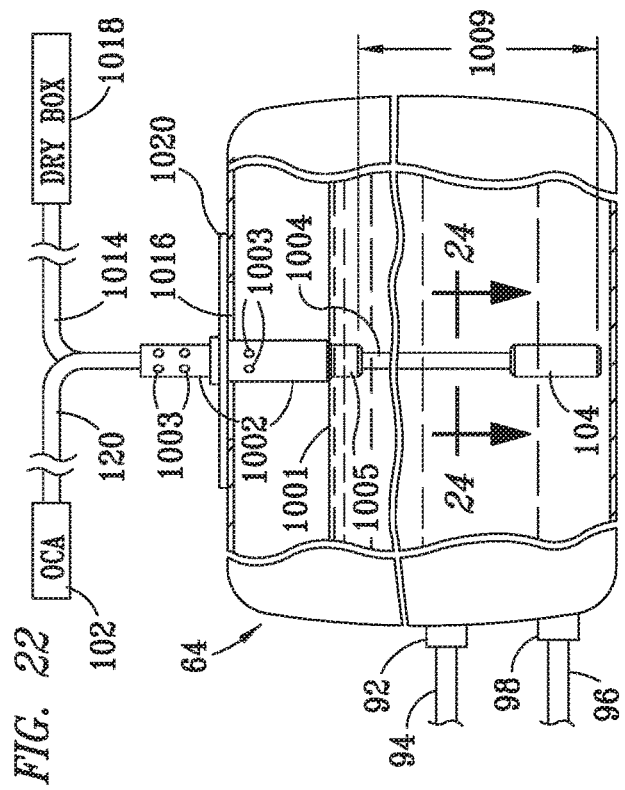

SYSTEM AND METHOD FOR DETERMINING VOLUME OF FLUID IN A TANK

CROSS-REFERENCE TO RELATED APPLICATIONS

This application is a continuation-in-part of U.S. application Ser. No. 14/529,118 filed Oct. 30, 2014, which claimed the benefit of U.S. Provisional Application No. 61/897,426, filed Oct. 30, 2013, and this application is a continuation-in-part of U.S. application Ser. No. 15/391,813, filed on Dec. 27, 2016, which is a continuation-in-part of U.S. Pat. No. 9,528,872, formerly U.S. application Ser. No. 14/529,137, filed on Oct. 30, 2014, and issued on Dec. 27, 2016, which claimed the benefit of U.S. Provisional Application No. 61/897,426, filed on Oct. 30, 2013, all of which applications are hereby incorporated herein by reference, in their entirety.

TECHNICAL FIELD OF THE INVENTION

This invention relates, in general, to systems and methods for determining at least one of the volume and quality of fluid in a tank and, more particularly, to systems and methods for determining the volume and quality of a fluid, such as gasoline or diesel fuel, used, for example, in a commercial transportation vehicle fleet.

BACKGROUND OF THE INVENTION

Vehicles, such as automobiles and trucks, require fuel to operate, such fuel as electric power, propane, hydrogen, gasoline, diesel fuel, liquefied natural gas (LNG), liquefied petroleum gas (LPG), and the like. Fuel must be stored in a fuel container such as, by way of example, one or more fuel tanks or batteries, and it can be appreciated that it is important that fuel not leak from a tank or be used more quickly than anticipated by a fuel system (e.g., leaking fuel supply lines or inappropriate operating engine conditions resulting in excessive fuel usage). This is even more important in the case of commercial tractor trailers that often must travel long stretches of highway between service stations. Further, if fuel leaks from a fuel tank, it could be dangerous as it could ignite into a fire or even explode, with obvious implications of danger to surroundings, including people in the vicinity.

Fuel losses may occur in other ways as well, such as by theft. For example, it is not uncommon for commercial vehicle operators to use company charge cards for purchasing fuel in large quantities. Unscrupulous vehicle operators have been known to make fuel charges for fuel which was not added to the fuel tank of the approved vehicle, but instead added to the fuel tank of an accomplice vehicle operator's vehicle for which the accomplice may give the unscrupulous vehicle owner a monetary kickback. Other schemes derived by unscrupulous vehicle operators include collusion with service station operators to overcharge company charge cards in exchange for a monetary kickback and siphoning fuel from the fuel tank. Service stations, truck stops or other fuel dispensing entities have even been known to heat diesel fuel to increase the volume as registered by the dispensing unit whereby the customer's energy value (i.e., BTU's) per gallon of received or dispensed fuel is decreased. Fuel dispensing entities have also been known to adjust fuel dispensing units to show more fuel delivered than is actually dispensed even though the fuel has not been heated.

To identify and confirm a fuel loss from a vehicle, whether the fuel loss be the result of leakage, inappropriate engine operating conditions, or theft, fuel volume must be accurately and reliably measured. There are a number of fuel volume measurement sensors available for doing that, including a mechanical or magnetic float sensor, an air bubbler sensor, a capacitive or radio frequency ("RF") sensor, a differential pressure (DP) level sensor, an electrical conductivity or resistance sensor, an optical sensor, a pressure membrane sensor, a radar or microwave sensor, and sonic or ultrasonic meters. The cited fluid volume measurements are described in greater detail at, for example, http://www.globalspec.com/learnmore/sensors_transducers_detectors/level_sensing/level_sensing_devices_all_types, but suffice here to say that all are either inaccurate, unreliable, not suitable for fuel, difficult to retrofit, and/or prohibitively expensive to implement.

In light of the foregoing, an ongoing need exists for systems and methods that can identify and confirm a fuel loss from a vehicle, whether the fuel loss be the result of leakage, inappropriate engine operating conditions, or theft, so that appropriate measures may be taken to prevent same from continuing and/or occurring in the future. Still further, it would be desirable that such systems and methods would optimize the fuel consumption cycle, including purchase, verification, and performance, for not only a single vehicle, but for a fleet of vehicles. In the implementation of such systems and methods, it would be desirable to have a fuel volume sensor that is accurate, reliable, suitable for fuel volume measurements, easy to retrofit, and not prohibitively expensive.

SUMMARY OF THE INVENTION

The present invention accordingly provides a system and method for determining volume of a fluid in a tank by first measuring the pressure of fluid proximate to the bottom of the tank. The depth of the fluid is then determined from the pressure and density of the fluid. Fluid volume is then determined mathematically or from charts given the depth as well as the size and shape of a tank. Multiple pressure readings may be taken along the bottom of a tank, and an average pressure determined that may be used to calculate volume. Pressure readings may be taken at different heights to determine fluid density used to calculate volume. Pressure readings may be adjusted for atmospheric pressure. Volume increases or decreases exceeding a predetermined threshold may be flagged and alerts generated. Volume calculations may be recorded for comparing against a volume of fluid recorded as being purchased.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic block diagram exemplifying one embodiment of a system for continuously determining volume of a consumable in any vehicle in a commercial vehicle fleet, according to the teachings presented herein;

FIG. 2 is a schematic block diagram exemplifying a remote server depicted in FIG. 1;

FIG. 3 exemplifies a tractor depicted in FIG. 1;

FIG. 4 is a schematic block diagram exemplifying an onboard computer subassembly utilized on the tractor of FIG. 3;

FIG. 8 is a screenshot diagram exemplifying details of an event depicted in the screenshot of FIG. 7;

FIG. 9 is a screenshot exemplifying details of a User Access Configuration form depicted in FIG. 6;

FIG. 11 is a screenshot exemplifying details of a Vehicle Fuel report depicted in FIG. 6;

FIG. 12 is a screenshot exemplifying details of a Fuel Loss Events report depicted in FIG. 6;

FIG. 13 is a screenshot exemplifying details of a Daily Fuel Logs report depicted in FIG. 6;

FIG. 14 is a screenshot exemplifying details of a Fuel Purchase Logs report depicted in FIG. 6;

FIGS. 15A and 15B is a screenshot exemplifying details of a Fuel Probe Configuration form depicted in FIG. 6;

FIGS. 16A and 16B is a screenshot exemplifying details of a Fuel Purchase Report Configuration form depicted in FIG. 6;

FIGS. 17A and 17B is a screenshot exemplifying details of a Report Configuration form depicted in FIG. 6;

FIGS. 18A and 18B is a screenshot exemplifying details of an Alerts Configuration form depicted in FIG. 6;

FIG. 19 is a screenshot exemplifying details of a product configuration form depicted in FIG. 6;

FIG. 20 is a screenshot exemplifying details of a Firmware Updates form depicted in FIG. 6;

FIG. 21 is a graphical schematic diagram exemplifying one embodiment of fuel optimization application of the system for determining volume of a consumable;

FIG. 22 exemplifies a single fuel volume sensor configured for insertion into a fuel tank of the tractor of FIG. 3;

FIG. 23 is a schematic block diagram of the fuel volume sensor of FIG. 22;

FIG. 24 is a cross-section of a tube taken along line 24-24 of FIG. 22;

FIG. 25 exemplifies a dual fuel volume sensor configured for insertion into a fuel tank of the tractor of FIG. 3;

DETAILED DESCRIPTION OF THE INVENTION

Figure 5A:
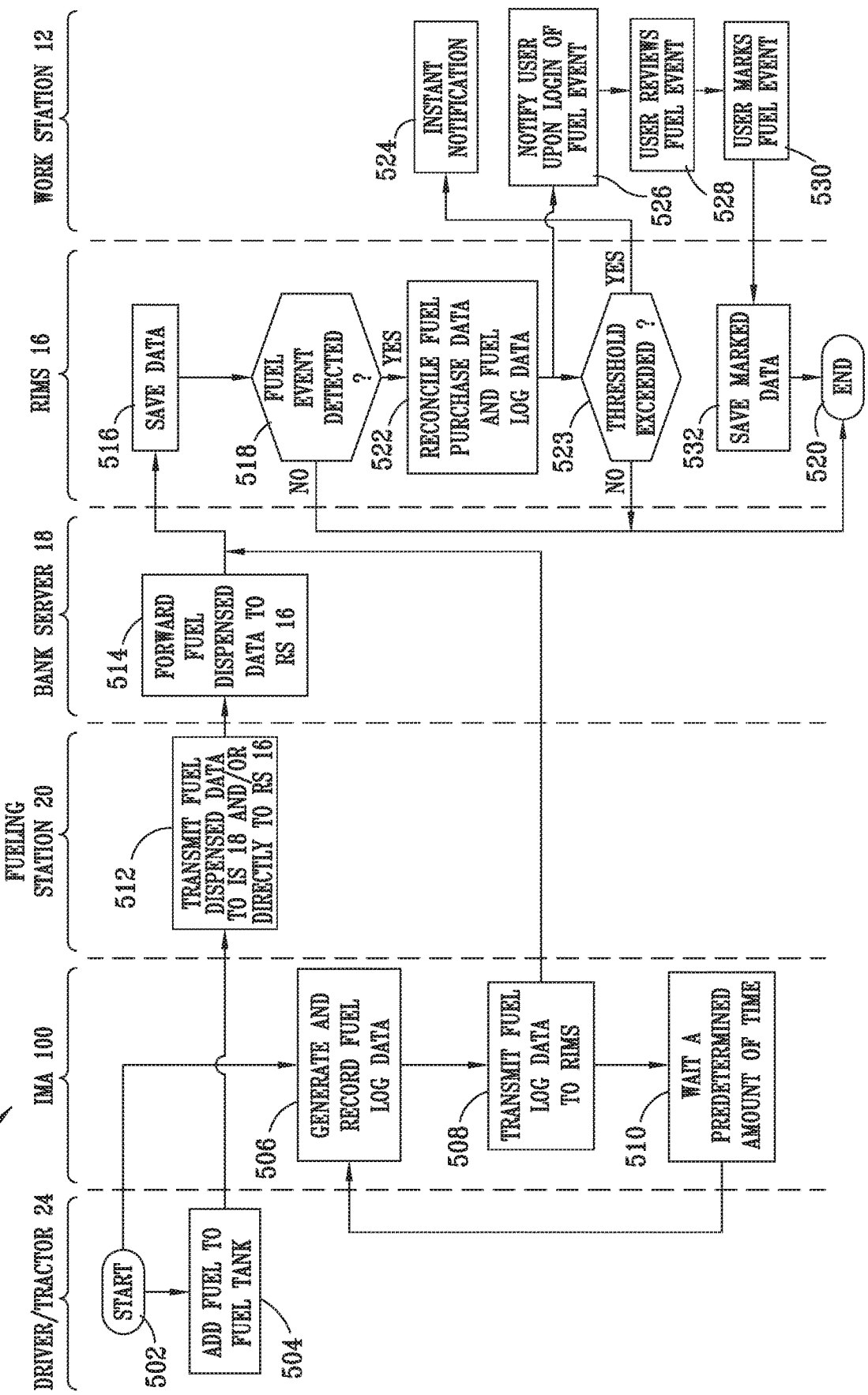
FIG. 5A is a flowchart exemplifying steps in a process for determining at a remote server whether a fuel event has occurred, according to teachings presented herein.

Refer now to the drawings wherein depicted elements are, for the sake of clarity, not necessarily shown to scale and wherein like or similar elements are designated by the same reference numeral through the several views. In the interest of conciseness, well-known elements may be illustrated in schematic or block diagram form in order not to obscure the present invention in unnecessary detail, and details concerning various other components known to the art, such as computers, workstations, data processors, databases, pressure and temperature sensors, data communication networks, radio communications, electrical power sources such as batteries and the like necessary for the operation of many electrical devices and systems, have not been shown or discussed in detail inasmuch as such details are not considered necessary to obtain a complete understanding of the present invention, and are considered to be within the skills of persons of ordinary skill in the relevant art. Additionally, as used herein, the term "substantially" is to be construed as a term of approximation.

It is noted that, unless indicated otherwise, computational and communication functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

For definitional purposes, the following terms will be used herein and throughout this disclosure. The term "fuel" includes any form of consumable energy, such as, by way of example but not limitation, electric power and fluids, both liquid and gaseous, such as gasoline, diesel fuel, propane, liquefied natural gas (LNG), liquefied petroleum gas (LPG), hydrogen, and the like, received from a fuel station. The term "fuel station" or "fueling station" includes any source or dispenser of fuel.

The term "volume" shall be used interchangeably and synonymously with the term "quantity" to refer to a volume or quantity of a liquid, or of a gas under a specified pressure, or the quantity of amperes-hours available at a given voltage from a source of electrical power, such as a battery. More specifically, when referring to the detected volume of fuel in a container or tank of a vehicle, it may be referred to as "measured volume". When referring to the volume of fuel dispensed by a pump at a fuel dispensing entity (e.g., at a the POS (point of sale) entity) or otherwise inserted in a tank as shown by the POS data, it may be referred to as "dispensed volume".

The term "quality" will used herein with reference to fluid fuels to refer to the energy, such as may be measured using British Thermal Units (BTU's), available per volumetric unit of a liquid or of a gas under a specified pressure.

Referring now to FIGS. 1 and 2, there is depicted a system for keeping track of at least detected or measured volume and also in some embodiments the calculated quantity and/or quality of a consumable energy source, which system is schematically illustrated and designated by the reference numeral 10. The system 10 includes a remote server ("RS") 16. As shown in FIG. 2, RS 16 includes at least a processor 202 and memory 204 interconnected via a bus 210. Memory 204 is effective for storing a database and computer program code executable by processor 202 for performing functions in accordance with principles of the invention, preferably as a communication web-implemented application, discussed in further detail below. RS 16 further includes capacity for a number of inputs and outputs ("I/O") 206, also discussed below.

Returning to FIG. 1, the system 10 further preferably includes at least one fuel dispensing station ("FDS") (sometimes also referred to as a point of sale or "POS") 20. FDS 20 is configured for supplying or dispensing a consumable energy source, referred to herein as "fuel", to at least one vehicle, such as a tractor 24 pulling a trailer 26, or any of a number of other types of vehicles, such as trucks (e.g., large-transport-on-highway vehicles), automobiles, trains, boats, ships, airplanes, railroad locomotives, electric transport vehicles, construction vehicles, municipality fleets, vehicle-independent applications (e.g., oil & gas drilling rigs), and the like, referred to collectively herein as a "tractor". By way of example, but not limitation, the term "fuel" as used in this application, including the claims, includes any consumable energy source such as gasoline, diesel, propane, hydrogen, electrical energy, oil, alcohol, urea, or other fuel or fluid, and the like, and combinations thereof (e.g., gasoline and alcohol). Thus the fuel may be stored in many types of fuel storage tanks or containers, also referred to herein as "fuel tanks", or simply "tanks", and including batteries. FDS 20 is preferably further adapted for receiving payment of fuel by way of a charge card, such as fuel cards, credit cards, and debit cards, in exchange for providing fuel, and for generating from such sale, fuel dispensed data 30. Fuel dispensed data 30 preferably includes an invoice number, an identification of who and/or for which vehicle fuel was purchased, a location, date, and time of a purchase, a quantity (e.g., number of gallons) and cost of fuel purchased, the cost including total cost as well as price per unit (e.g., gallon) of fuel purchased. Mileage of tractor 24 is optionally provided as well with the fuel dispensed data. Fuel dispensed data 30 preferably excludes any proprietary information, such as the number of a charge card that could be used to commit fraud against the legitimate holder of the card. FDS 20 is coupled via a network 28 for transmitting fuel dispensed data 30 to RS 16. Network 28 may comprise both wireless portions (e.g., cellular, satellite, Internet compatible signal transmission towers, Wi-Fi, and other similar network facilities) and/or wired portions effective for data communication. As indicated in FIG. 1, for typical FDS units located on a highway, this data would be transmitted via a data communication network 28, and optionally through an intermediate server ("IS") 18 utilized by a clearinghouse, financial institution, or the like that is set up to handle charge card transactions for the FDS. As shown, the IS server 18 is coupled via network 28 for forwarding fuel dispensed data 30 to RS 16 via I/O 206.

As is readily apparent, a trucking company may well have ownership or some controlling interest in one or more locations providing a refueling entity that may be used to provide POS-type data and this refueling entity may have associated fuel dispensed data of the type mentioned above in connection with FDS 20 transmitted directly from the refueling entity to RS 16 via data communication network 28 thus eliminating any need for an IS 18. Thus, IS 18 is shown in dashed line format since clearinghouse type action would not always be required.

As discussed in further detail below with respect to FIG. 3, tractor 24 preferably includes a fuel sensor 104 positioned in each of at least one fuel tank, and is effective for measuring characteristics of fuel, referred to herein as fuel log data 32, discussed in further detail below with respect to FIG. 4, and for transmitting that fuel log data to an onboard computer assembly ("OCA") 102, mounted on the tractor. OCA 102 is coupled via network 28 for transmitting fuel log data 32 to RS 16 via I/O 206. As discussed in further detail below with respect to FIG. 23, a "mesh buffer" may optionally be positioned in or over the input port of fuel sensor 104 to dampen fluctuations in fuel pressure which may result from vibration, vehicle acceleration and de-acceleration, and any accompanying sloshing of fuel in a fuel tank.

At least one work station 12 is also coupled to RS 16 via network 28. Work station 12 preferably includes a processor and memory (not shown) configured for storing computer program code executable by the processor for providing an interface between RS 16 and a user. While not shown, a "user", as the term is used herein, includes, by way of example but not limitation, a transportation fleet administrator or manager, or a transportation carrier or logistics provider responsible for managing a fleet of tractors, such as tractor 24, to haul various goods on trailers. Work station 12 preferably also includes conventional computer input devices, such as a keyboard and mouse, and output devices, such as a display monitor 13.

FIG. 3 depicts in greater detail a tractor 24 equipped for functioning in accordance with principles of the invention. The tractor 24 includes an engine compartment 40 housing an engine and other components, as well as a cabin 48 positioned behind engine compartment 40 and above a vehicle chassis 50. Two storage tanks, referred to herein as fuel tanks, 64 (only one of which is shown) are typically mounted to the vehicle chassis 50 anterior to cabin 48. As is well known, a majority of late-model trucks throughout the world include a Controller Area Network ("CAN") comprising a computer network or bus formulated by the vehicle's electronic control units for transmitting or relaying messages between sensors, electronic control circuits and controlled devices throughout the vehicle. Thus, a block 103 representing the CAN system is shown as being part of the vehicle 24.

In one embodiment, the system 10 components associated with tractor 24 include, but are not limited to, a sensor unit or fuel sensor assembly ("FSA") 100 having an onboard computer assembly ("OCA") 102 coupled via a data communication link 120 to at least one sensor 104 positioned within each of at least one respective fuel tank 64 for detecting fuel volume, density, temperature, and/or quality as discussed in further detail below with respect to FIGS. 21-28. In one implementation, the OCA 102 may be partially or totally integrated with an onboard diagnostic recorder (not shown) of tractor 24 as well as interconnected to the CAN network 103, as illustrated.

Figure 15B:
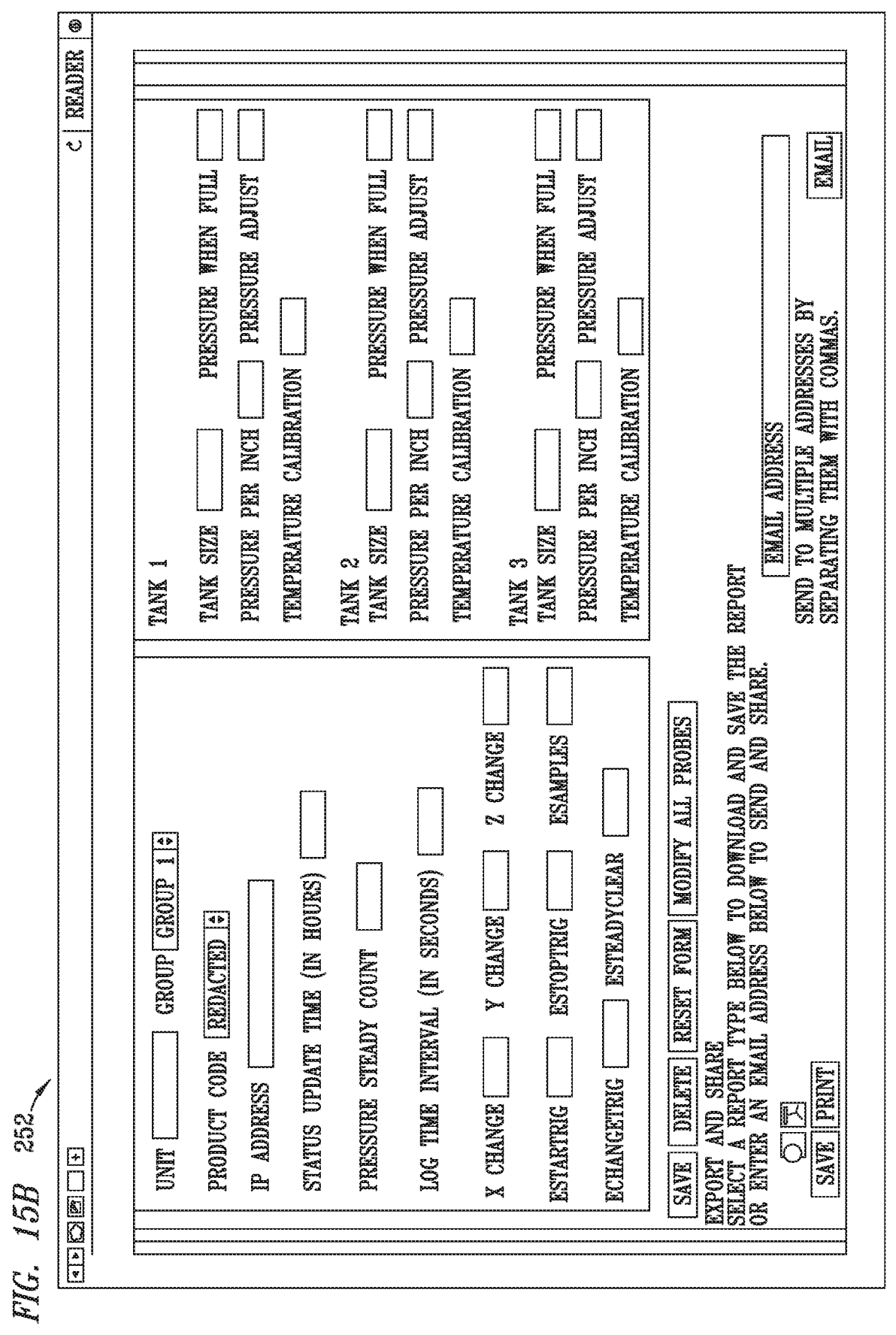

As shown most clearly in FIG. 4, the FSA 100 and, in particular, the OCA 102, includes a processor 172, a memory 174, and various inputs and outputs ("I/O") 176 interconnected via a bus 180. Memory 174 is preferably flash memory, effective for storing computer program code executable by processor 172. At least one sensor 104 is preferably coupled via link 120 to I/O 176 for providing to OCA 102 data signals indicative of measured fuel volume. From this measured fuel volume, well known calculations can be made to determine density and quality as may be obtained by also checking the pressure and temperature of liquid fuels such as gasoline and diesel fuel. Further inputs to OCA 102 include data indicative of mileage of the tractor 24 received via line 136 from an odometer 134 located within the cabin 48 or equivalent component on tractor 24. In one implementation, OCA 102 I/O 176 optionally includes an accelerometer 138, such as a three-axis, self-orientating accelerometer, which may provide data such as the motion, degree of incline, and event-related activity of tractor 24. Various compensational adjustments may be made to the data based on the accelerometer readings, discussed further below with respect to FIGS. 15A and 15B. In the illustrated implementation, the FSA 100 preferably also includes a Global Positioning System ("GPS") 190 coupled to the OCA 102 through I/O 176 for facilitating the generation of data relative to the vehicle location and date/time. Data generated by OCA 102 may, as previously indicated, also include access to the controller area network CAN which as previously indicated comprises a vehicle bus standard designed to allow microcontrollers and devices to communicate with each other within a vehicle without a host computer. In another embodiment, a sensor may optionally be provided to even more accurately measure fuel quality than the system as illustrated in FIG. 4, such as BTU-values or other quality characteristics that would assist in further determining the quality of the fuel. Data input, such as measured fuel volume, fuel temperature, fuel quality, mileage, accelerometer data, location, tractor identification, date and time, are referred to collectively herein as "fuel log data". OCA 102 I/O 176 includes a transceiver 182 coupled via a line 137 to an antenna 60 (FIG. 3) mounted in the cabin 48 for transmitting fuel log data via network 28 to RS 16. The CAN system 103 is also illustrated as communicating with the input output block 176.

FIG. 5A is a flow chart of preferred steps performed by system 10 for determining the volume, and/or quality of a consumable, such as gasoline or diesel fuel, used, for example, in a vehicle whether or not in a commercial transportation vehicle fleet where the determination as to whether or not a fuel event has occurred is accomplished at the RS server 16. Beginning at step 502, execution proceeds to steps 504 and 506. At step 504, a driver of tractor 24 adds fuel purchased from a FDS 20 to at least one tank 64 of his/her tractor. At step 512, the FDS 20 generates and transmits fuel dispensed data 30 (e.g., invoice number, vendor, date and time, location, vehicle or driver identification, dispensed volume of fuel purchased, and total and per unit cost of the fuel) to IS 18 which, in step 514, forwards the data to RS 16 which, in step 516, saves the data to memory 204. As indicated supra, in some embodiments and locations of an FDS, block 514 is bypassed and the data from the tractor 24 is transmitted directly to the save data block 516 in the RS 16. Returning to step 506, the at least one fuel sensor 104 of FSA 100 generates one or more data signals indicative of one or more of the fuel pressure, density, volume, and fuel temperature, and transmits same to OCA 102. OCA 102 then generates fuel log data, including fuel pressure, density, along with measured volume (and optionally temperature), vehicle and/or driver identification, date/time, and location. In step 508, OCA 102 transmits the fuel log data to RS 16. At step 516, the fuel log data 32 is saved to memory 204 of RS 16. In step 510, OCA 102 waits a predetermined length of time, such as thirty seconds, and execution returns to step 506. As may be expanded upon later, the "wait time" may optionally very depending upon the operational status of the vehicle. In other words, if the engine is off and is at a location corresponding to where a driver might sleep or eat, the time may be extended too many minutes. On the other hand, if the vehicle is being refueled the length of time between determinations may be reduced as indicated infra. Also, if it is detected that fuel volume is decreasing faster than normal based on the detected operational status of the vehicle, the time between volume detections would preferably be reduced for the purpose of determining leakage or theft of fuel from the fuel tank or fuel loss from accompanying fuel transmission lines or severe engine operational factors.

It may be appreciated that there may be hundreds of transmissions of fuel log data 32 from FSA 100 for each transmission of fuel dispensed data from fueling FDS 20. Furthermore, in an alternative embodiment of the invention, fuel log data 32 may be accumulated in OCA 102 and not transmitted to RS 16 until a predetermined quantity of data is accumulated, until there is an increase in fuel volume (e.g., a fill-up or additional quantity of fuel appropriate to travel to a more desirable additional energy source), a significant decrease in fuel is detected, or until the accelerometer 138 (or alternatively, GPS 190 or speedometer 134) indicates that the tractor has stopped long enough (e.g., 30 seconds, preferably a configurable time) to add fuel to its at least one fuel tank. Because fuel levels may vary due to motion, vibrations, sloshing in the tank, and the like, it is preferable to use rolling averages of fuel volume calculated from averaging a predetermined number of the most recent volume calculations each time a new measurement is taken. It may be preferable in many instances to reduce the increment of time between measurements (e.g., from 30 seconds to 1 second) when fuel is being added to a tank (as may be determined as described above using an accelerometer, GPS, or speedometer) so that more accurate measurements may be made during fill-ups.

Subsequent to saving fuel dispensed data 30 and fuel log data 32 at step 516, execution proceeds to step 518 wherein a determination is made whether there is a "fuel event." A fuel event occurs when there is a non-trivial or unexpected increase or decrease (i.e., loss) in fuel volume or quality, that is, an increase or decrease in fuel volume which exceeds a predetermined threshold for a predetermined period of time. This can happen in at least the following three scenarios:

1. A decrease in measured volume reported by fuel log data 32, which decrease exceeds, by at least a predetermined threshold amount over a predetermined period of time, a decrease that would be expected from the consumption of fuel by an engine, that is, that would be attributable to mileage or miles per gallon ("MPG"); this would indicate a fuel loss that could result from, for example, leakage from a hole in a fuel tank and/or fuel system which could result in economical and environmental impacts (wherein execution would proceed to step 526, discussed below). In another example, a fuel decrease could result from fuel theft (e.g., siphoning of fuel) (wherein execution would proceed to steps 524 and 526, discussed below).

2. An increase in volume or quality reported similarly by both fuel dispensed data 30 and fuel log data 32, i.e., a normal fill-up (wherein execution would proceed to step 526, discussed below).

3. An increase in volume or quality, wherein the dispensed volume value reported by fuel dispensed data 30 exceeds a measured volume of similar value reported by fuel log data 32 by a predetermined threshold for a predetermined period of time, in which case an alert is generated. This alert may indicate that a fueling station 20 ran up the number of gallons on the transaction and gave a driver a monetary kickback. This could also occur when a fueling station 20 up-charged a customer on a per/gallon basis (wherein execution would proceed to steps 524 and 526, discussed below).

Accordingly, a non-trivial fuel measured volume increase may occur when there is at least a start of a fill-up, rather than motion, vibration, and/or sloshing of fuel in a tank. A non-trivial fuel volume decrease may occur when there is a theft by the siphoning of fuel from a tank, rather than for reasons attributable to miles per gallon ("MPG") of fuel. If, at step 518, a transmission of fuel log data is received that does not indicate a non-trivial increase or decrease in fuel volume, then no fuel event is deemed to have occurred, and execution proceeds to, and terminates at, step 520. If, at step 518, a non-trivial increase or decrease in fuel volume is detected, then a fuel event is deemed to have occurred, and execution proceeds to step 522.

At step 522, if a non-trivial increase in measured fuel volume has been detected, then there should also be corresponding fuel dispensed data having substantially similar date and time stamps for a respective tractor 24. RS 16 attempts to identify such fuel dispensed data. If such fuel dispensed data cannot be located, an indication of "zero" dispensed volume may be recorded and a report of same is generated. If such fuel dispensed data is identified, then the volume of fuel purchased is compared with the volume of fuel logged and a difference is determined; execution then proceeds to steps 523 and 526. In step 523, a determination is made whether the difference determined in step 522 exceeds a predetermined threshold, such as a fuel loss greater than ten gallons, a fuel temperature that rises more than a predetermined threshold or a fuel temperature that drops below 32° F. If it is determined that such threshold has been exceeded, then execution proceeds to step 524; otherwise, execution from step 523 terminates at step 520. In step 524, the fuel dispensed data, fuel log data, and difference is preferably transmitted via email to the workstation 12 for presentation on display 13 and/or via text (e.g., Short Message Service ("SMS")) to a user for instant notification.

It should be noted that in step 522, while it would be obvious if a nontrivial decrease in measured fuel volume is detected there would be no corresponding fuel dispensed data, the same procedure is followed in checking fuel dispensed data, and reporting the fuel event and a zero indication of dispensed volume along with the measured volume of fuel decrease.

In step 526, upon login to workstation 12, a user is notified of the fuel event, preferably by a report on display 13 (discussed in greater detail below with respect to FIG. 7), or alternatively by a hard copy printout. In step 528, the user preferably reviews the report and determines whether any action is necessitated, marking the report accordingly in step 530, the marking preferably including the date and time of review, as well as the identification of reviewer. By way of example, if the difference between the dispensed volume of fuel purchased (per fuel dispensed data 30) and the measured volume of fuel logged (per fuel log data 32) indicates that the amount of fuel purchased was greater than the amount of fuel logged in the at least one tank 64, then fraud is suggested, and appropriate action may be taken against the driver to resolve the situation. Similarly, if a non-trivial decrease in fuel occurs, suggesting that fuel has been siphoned off by way of theft, then appropriate action may be taken against the driver to resolve the situation. In step 532, the report, including any mark-ups, is saved in memory 204 of RS 16. Execution is then terminated at step 520.

Figure 5B:
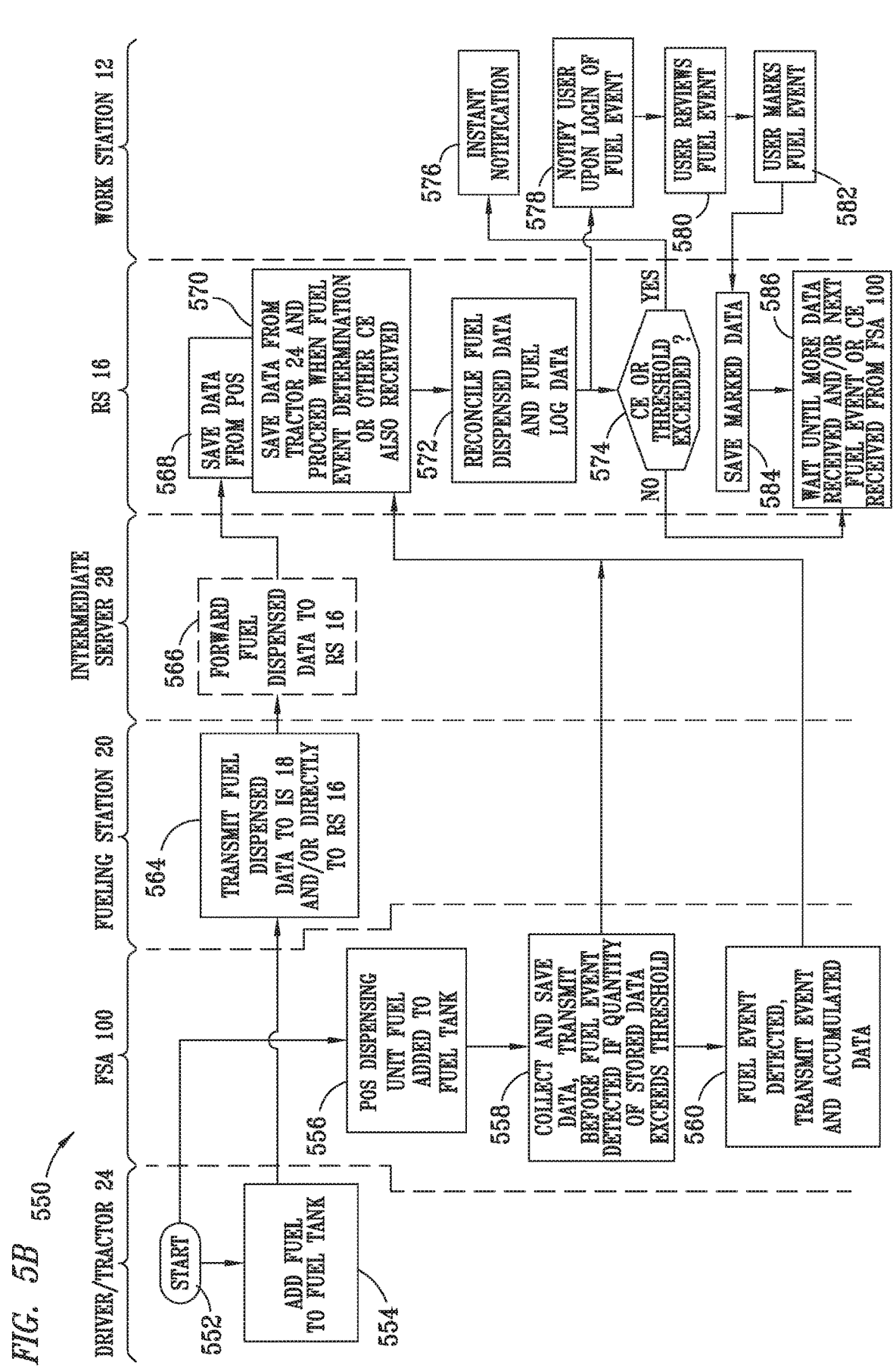
FIG. 5B is a flowchart exemplifying steps in a process for determining at a vehicle whether a fuel event has occurred, according to teachings presented herein.

FIG. 5B is very similar to FIG. 5A in showing a flow chart for accomplishing the same end result except that the fuel event is determined in the processor 102 of the FSA 100 rather than in RS 16, though RS 16 may be used to confirm a fuel event. Having the vehicle transmitting data only when the memory of FSA is substantially full or when a fuel event and/or other critical event (CE) requiring instant notification has occurred substantially reduces the work at the remote server 16 and reduces the likelihood that a large number of transmissions are trying to be received by the server 16 at the same time. As shown, the process is designated as 550 and commences with the start step 552. When the vehicle 24 is finished receiving fuel as dispensed at a FDS, the driver will submit the charge card to the FDS and the FDS will transmit the fuel dispensed data either to the intermediate server (IS) 18 or directly to the remote server 16 as set forth in steps 564, 566 and 568. The remote station 16 will save the data received and await input from the vehicle 24.

As set forth in step 556, the FSA 100 will continuously determine fuel level status and send this information to step 558 for collection and saving and thus when fuel is added to the tank or deleted from the tank in amounts outside normal operational parameters, a fuel event is detected as set forth in step 560. FSA 100 has a limited amount of memory available for storage of detected data. Prior to the time that a fuel event or CE is detected, and as shown in step 558, if the amount of data in memory exceeds a predetermined threshold, FSA 100 may at any time send data (e.g., in batches) to remote station 16 wherein it is saved as noted in step 570. When more than a given amount of fuel level change is detected by fuel sensor 104 in a given amount of time as determined by the computer 102, FSA 100 may immediately notify remote station 16 that a fuel event (or possibly even a critical event such as an extreme loss of fluid while the truck is still moving) has been initiated and later send another notification that the fuel event has been completed and send previously collected data in both instances. On the other hand FSA 100 may alternatively be programmed or designed to send the fuel event notification only after the fuel level has stopped changing significantly and a given period of time has elapsed.

The processor 102 in FSA 100 may be programmed to only save and/or transmit collected data to step 570 that it deems relevant (e.g., indicative of a fuel event) depending upon operational circumstances. In other words, on a long-distance trip with no abnormalities detected, even though it may collect data every few seconds, it may only save and store the data every few minutes as long as nothing critical is detected such as low temperature of the fuel or excessive change in volume or quality. Further, even though data may be saved and stored, the processor 102 may, according to given parameters, eliminate or otherwise not transmit certain data that remains substantially identical to other stored data. This elimination of data would certainly be realistic when the vehicle is parked for an entire night at a motel when the engine is inoperative and there has been no detection of fuel level change or significant temperature change for the entire night and no other critical event situations are detected.

Once the remote station 16 has received a determination of a fuel event or receives other critical event information, the fuel dispensed data is reconciled in step 572 before the program proceeds to decision step 574. If no CE or threshold is noted the program proceeds to step 586 where the RS 16 waits until a more data is received or a fuel event or CE is received as shown in steps 568 and 570. The data from step 572 is also sent to step 578 to notify the user of the fuel event. The program proceeds to step 580 where the user reviews the fuel event, marks it as illustrated in step 582 and the data is saved in step 584 before proceeding to the wait step 586. As also shown, if a critical event notification is received or a threshold is exceeded, as determined in decision step 574, the process to step 576 whereby instant notification is provided as previously indicated in connection with FIG. 5A.

Figure 6:
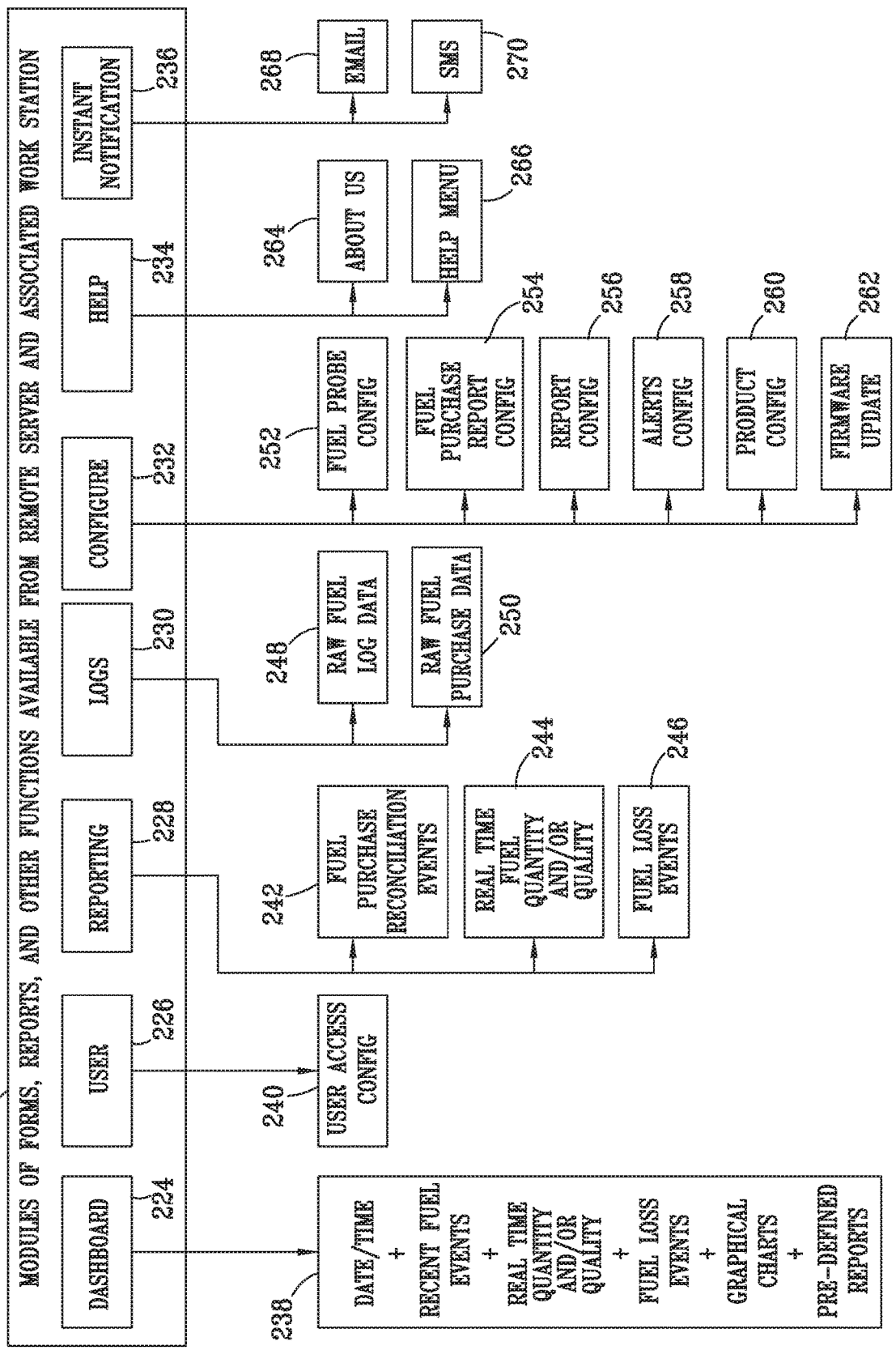
FIG. 6 is a graphical block diagram depicting one embodiment of operational modules, which form a portion of the system for determining volume of a consumable exemplified in FIG. 1.

FIG. 6 illustrates seven categories or modules 220 of forms, reports, and functions 222 available from RS 16 upon execution by processor 202 of computer program code stored in memory 204 for keeping track of a consumable, such as fuel. The modules 220 are preferably accessible via menu buttons such as exemplified proximate to the upper right portion of the forms and reports described here. As discussed in further detail below, the modules 220 include a dashboard module 224, a user module 226, a reporting module 228, a logs module 230, a configure module 232, a help module 234, and an instant notification module 236. These menu items are preferably accessible via software "buttons" provided on the forms and reports described herein, and exemplified proximate to the upper portion of each form and report described herein.

Figure 7:
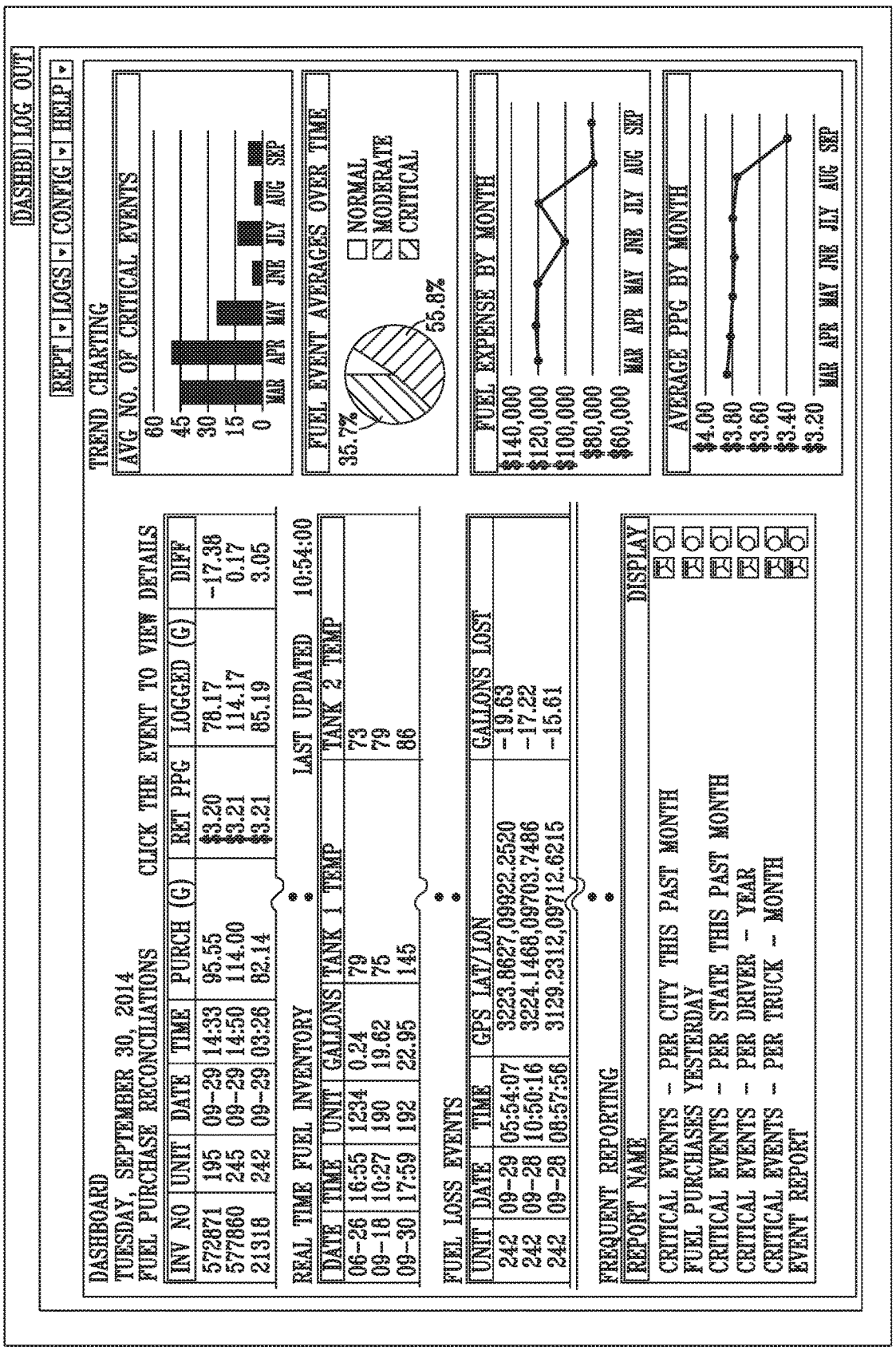
FIG. 7 is a screenshot exemplifying details of a Dashboard report depicted by FIG. 6.

More specifically, and with reference to FIG. 7, the dashboard report 238 is preferably the first screen a user sees when he or she logs onto RS 16, and preferably provides up-to-date, real-time information about the system 10. By way of example and not limitation, the dashboard module 224 preferably supports the generation and presentation of a dashboard report 238 that includes date/time, recent fuel events (e.g., fuel tank fill-ups), real time inventory, fuel loss events, graphical trend charts, and a number of frequently used, pre-defined reports, as discussed in further detail below.

Figure 8:
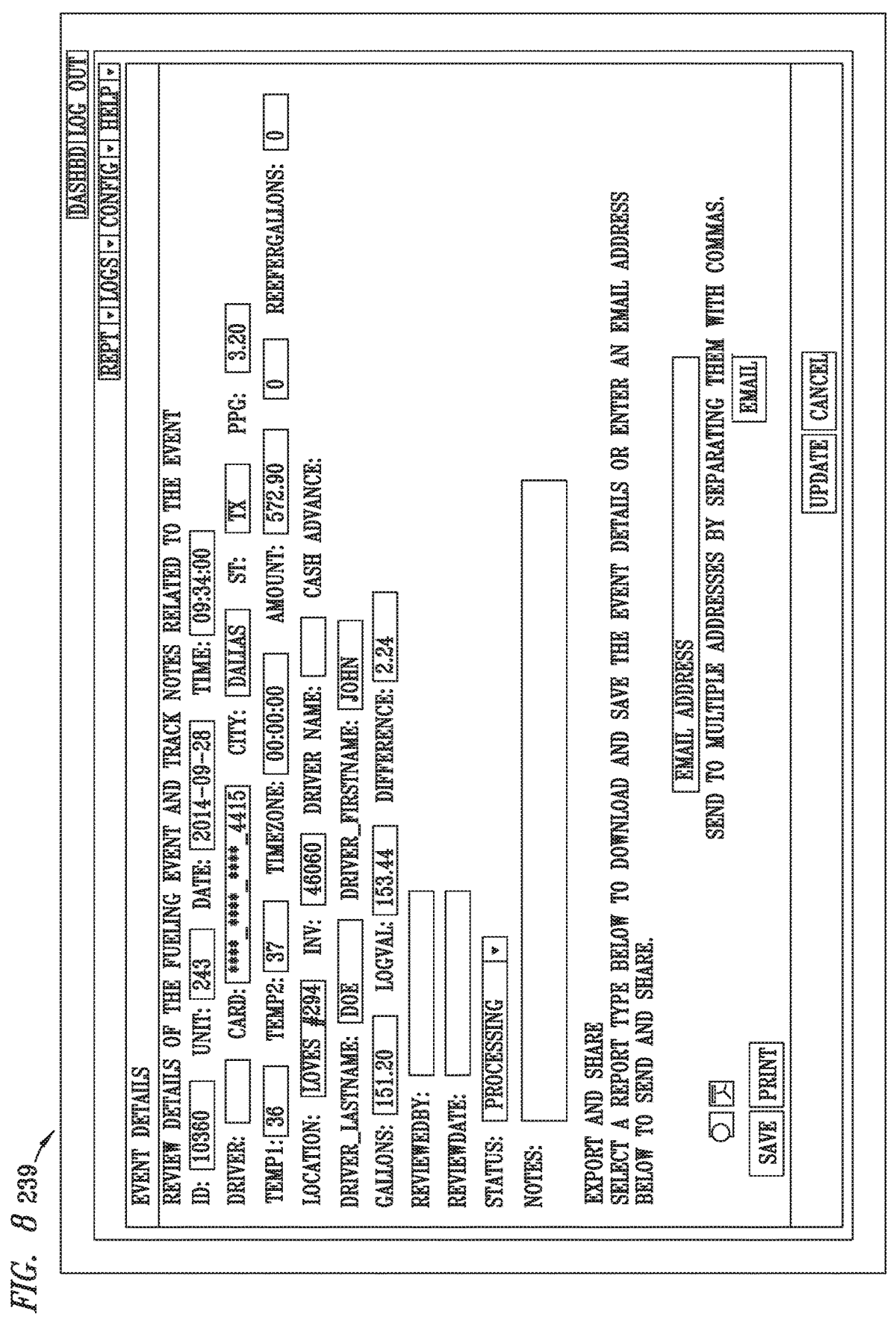
Figure 10B:
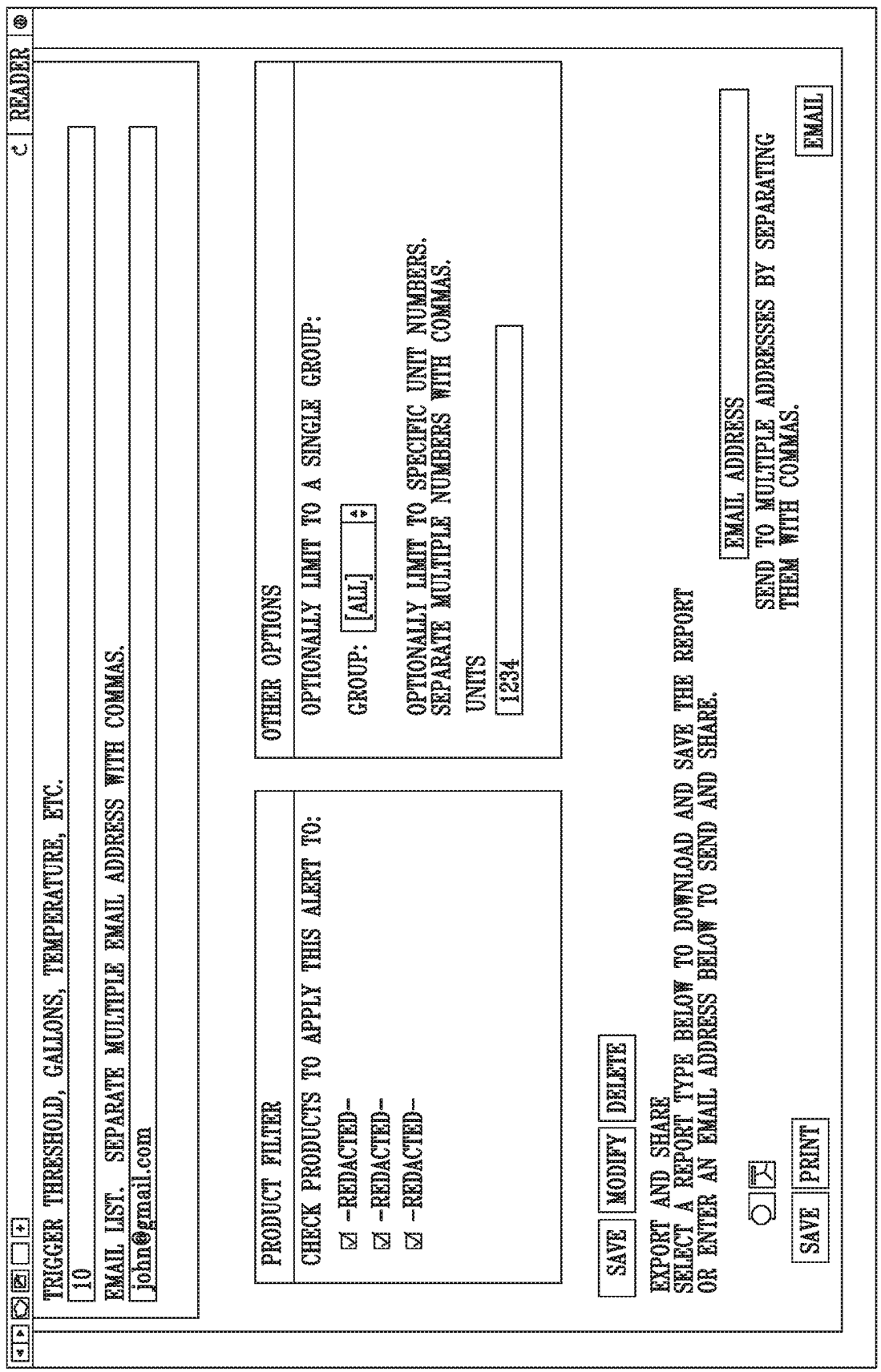
FIG. 10 is a screenshot exemplifying details of a Fuel Purchase Reconciliation Report depicted in FIG. 6.

Recent fuel events, also referred to as fuel purchase reconciliations and discussed above with respect to steps 518 and 522 of FIG. 5A, present both fuel dispensed data 30 with fuel log data 32, related by common data including date, time, and preferably unit, or tractor, ID. Fuel dispensed data 30 preferably also includes invoice number, the number of gallons purchased, and the retail price per gallon ("PPG"). Fuel log data 32 preferably further provides measured gallons received. Then, as also depicted by step 522 of FIG. 5A, discussed above, gallons purchased is compared with gallons received, and the difference, also referred to as a reconciliation, is presented. If a user clicks on a row, or record, of the fuel purchase reconciliations, an event details report 239 pops up, as exemplified in FIG. 8. It is considered that the information depicted in FIG. 8 is self-explanatory and, therefore, does not warrants detailed discussion. While the dashboard report 238 as exemplified only displays recent fuel events, fuel event data for any date range is available from the Fuel Purchase Reconciliations Report 242, available under the reporting module 228 and exemplified by FIG. 10.

The dashboard report 238 further preferably includes recent Vehicle Fuel I data, which provides current information about the status of fuel in fuel tanks 64. Such information preferably includes not only current gallons of fuel available for each tractor 24, but also the temperature of the fuel in each tank 64 of tractor 24. Fuel temperature is important to monitor because, as fuel gets cool under cold-weather conditions, it may begin to approach a gel state, wherein the viscosity of the fuel begins to change which can have a significant detrimental impact on the performance of an engine. As such, RS 16 notifies a user when the temperature of the fuel is approaching a gel-like state so that the driver can take proactive steps (e.g., add an additive to the fuel or switch to a different fuel) to prevent or prepare for such a situation. While the dashboard report 238, as exemplified, only displays recent fuel inventory data, fuel inventory data for any date range is available from the Vehicle Fuel Report 244, available under reporting module 228 and exemplified by FIG. 11.

Still further, dashboard report 238 preferably also reports recent fuel loss events, that is, a non-trivial decrease in fuel that is not accountable by use of fuel by the tractor 24, but is possibly due to fuel theft, such as siphoning of fuel from a fuel tank. If there is such a fuel theft event, then the user will be notified by the dashboard report. As discussed above with respect to step 524 of flow chart 500 (FIG. 5A), a user and respective driver are notified immediately of such theft via email and/or SMS text messaging. While the dashboard report 238 as exemplified only displays recent fuel loss events, fuel loss data for any date range is available from the Fuel Loss Events report 246, available under reporting module 228 and exemplified by FIG. 12.

The dashboard report 238 preferably also includes graphical trend charts, including charts showing the average number of fuel events in recent months, what proportion of fuel events are considered normal, of moderate concern, and of critical concern. Charts are preferably also provided showing fuel expenses for recent months, as well as average price per gallon of fuel for recent months.

Access to other pre-defined reports that are frequently used are also provided. By way of example, pre-defined reports may include reports of critical (e.g., auditable) events by city, state, driver, and/or truck for the past month, year, or other selected time period. Pre-defined reports may further include reports of the percentage of fuel purchases (by vehicle) resulting in a critical event, or of fuel purchases made the previous day, for example. An event report may be generated to show fuel purchase reconciliations for a predetermined time period, such as year-to-date, or a rolling previous period, such as the previous six or twelve months. This would allow a user to easily access all such transactions rather than having to wade through the reporting menu and search for them.

Under user module 226, a user, preferably limited to an administrative user, may access a User Access Configuration report 240. As shown most clearly by FIG. 9, the user access configuration report identifies all users who have access to RS 16, preferably including their respective user name, email address, access group or privilege, and the last time they logged onto RS. Through the User Access Configuration report, a user with administrative rights may control who has access to RS 16 by adding users, removing users, and establishing and modifying user profiles, including their security rights, also referred to as privileges. By way of example, two security profiles are depicted in FIG. 9: (1) a "system administrative" profile, which has no restrictions, and (2) a "viewer" profile, which is limited to viewing forms and reports, but not entering or editing any data on them.

Under the reporting module 228, three reports 242, 244, and 246 (FIGS. 10-12) are available, which report similar data as discussed above with respect to dashboard 238, but which cover any date range selectable by a user. The substance of these reports has been discussed above, and therefore will not be discussed in further detail herein.

Under the logs module 230, two reports are available: (1) a raw fuel log data report (entitled "Daily Fuel Logs") 248 and (2) a raw fuel dispensed data report (entitled "Fuel Purchase Logs") 250, exemplified by FIGS. 13 and 14, respectively. The raw fuel log data report 248 reports fuel log data 32 that is received from the OCA 102, and the raw fuel dispensed data report 250 reports fuel dispensed data 30 that is received from the IS 18 or fueling station 20. Data in reports 248 and 250 is used in other reports, such as the dashboard report 238, the three reports 242, 244, and 246, as well as the process depicted in flow chart 500 discussed above with respect to FIG. 5.

Configure module 232 preferably includes at least six forms 252-262 that enable users to configure various aspects of RS 16. A Fuel Probe Configuration form 252, exemplified by FIGS. 15A and 15B, enables a user to configure and customize the settings of individual fuel probes, or groups of probes, also referred to herein as fuel sensors, 104. These configurations are then sent to the unit (e.g., tractor 24), allowing for substantially real-time updates to be made to sensors 104. As shown on FIGS. 15A and 15B, some of the settings constituting the configurations include the following:

IP Address: for the tractor 24

Status Update Time: how often (preferably in hours) a tractor 24 transmits a report to RS 16, the report including fuel log data accumulated subsequent to a last transmission, fuel log data preferably including pressure and temperature readings, GPS data, accelerometer data, and date/time stamps Pressure steady count: number of counts (i.e., units of measurement arbitrarily chosen for convenience in using the invention) in pressure that are considered to be slight variations that are not taken into account when assessing whether or not there has been a fuel event (e.g., a fill-up or fuel loss)

Log time interval: how often (preferably in seconds) fuel log data 32 is written to memory 174 of the OCA 102 (i.e., sample rate)

X, Y, Z change: the threshold amount of change allowed in the X, Y, or Z directions of the accelerometer 138 before it is considered to indicate movement of the tractor 24 estartrig: the threshold for number of increase or decrease counts that will trigger the start of a fuel add or loss event, respectively estoptrig: the threshold for number of increase, decrease or steady counts that will trigger the end of a fuel add or loss event esamples: the number of pressure samples in the event averaging buffer echangetrig: the pressure change threshold that is considered to result from a "change in pressure" rather than random movement of fuel, such as sloshing esteadyclear: the number of times a pressure change less than "echangetrig" that will clear the up/down change counters esloshcount: the number of seconds to wait after movement of the tractor 24 has been detected before starting all event counters, that is, configuration variables that have to do with how the fuel events (e.g., fill-ups or fuel losses) are detected and processed geltemp: the temperature at which fuel begins to gel Tank Size: size of the tank (e.g., in gallons)

Pressure when full: total pressure reading when tank 64 is full

Pressure per inch: reading from the sensor 104 that will be considered an inch of fuel Pressure adjust: a value always added to pressure readings from the sensor 104 to account for pressure sensors being slightly off the bottom of a tank 64

It is considered that the use of the above-identified variables and settings in the system 10 of the invention would be apparent to a person having ordinary skill in the art upon a reading of the description of the invention herein, and therefore will not be described in further detail herein, except to the extent necessary to describe the invention.

Figure 16A:
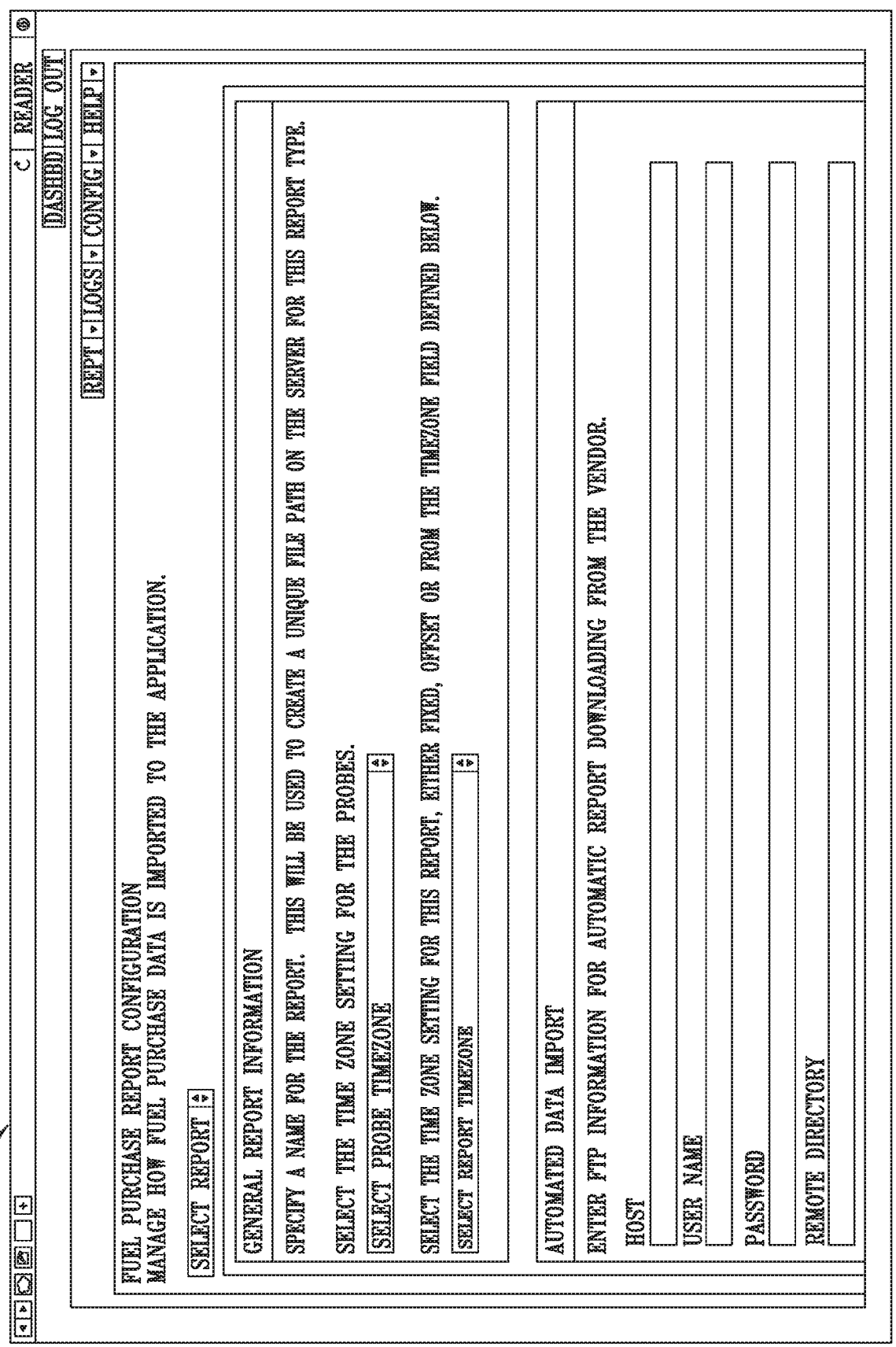
Figure 16B:
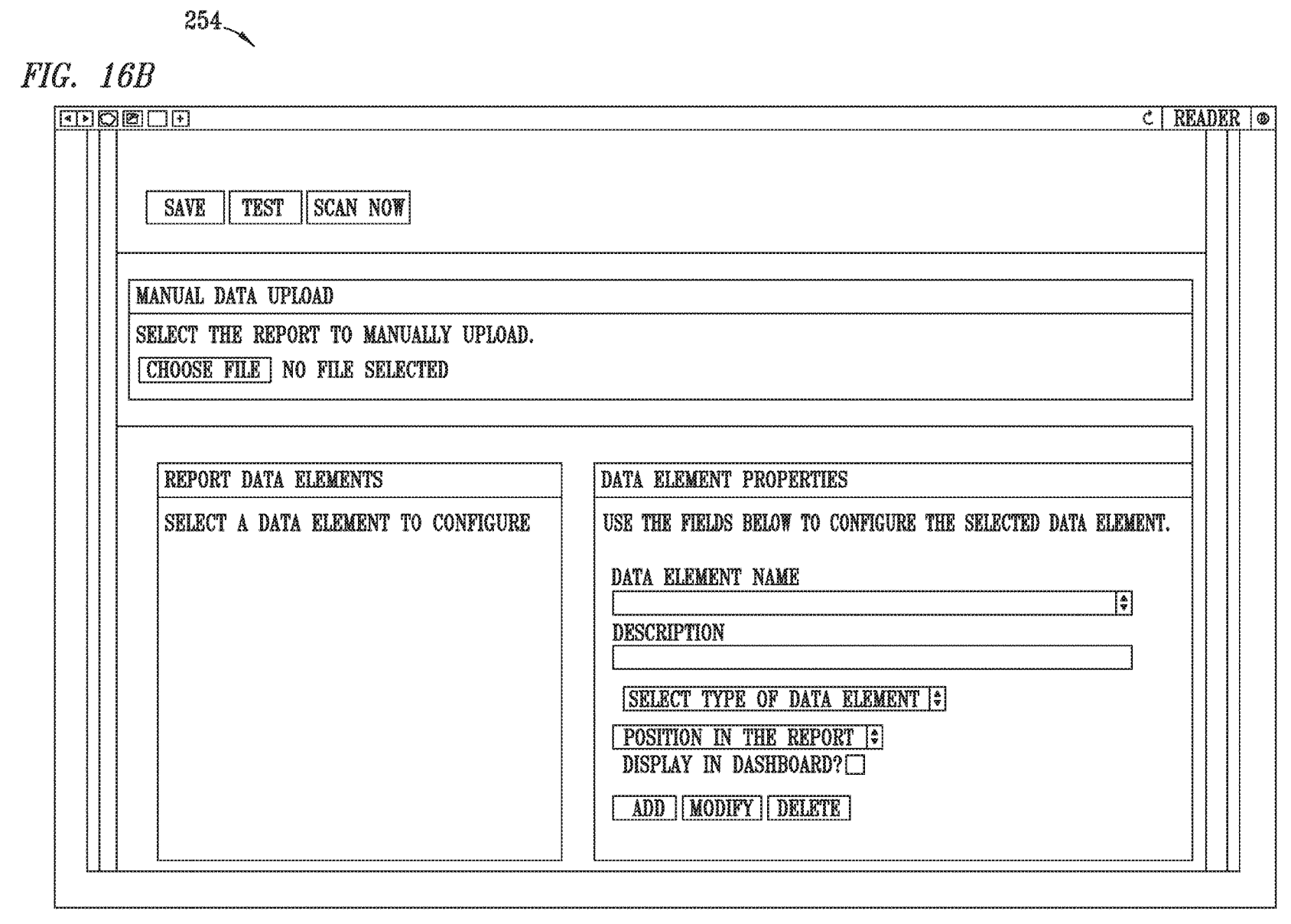

A Fuel Purchase Report Configuration form 254, exemplified by FIGS. 16A and 16B, enables a user to configure the fuel purchase reports, which are used for fuel event reconciliations against raw fuel log data. The user may manage how fuel dispensed data 30 is imported from intermediate server (IS) 18 to RS 16 by configuring automated data downloads from IS 18, either in real time or periodically (e.g., in nightly batches), or by manually downloading charge card data in spreadsheet format from IS 18 to workstation 12 followed by upload (via form 254) of spreadsheet from workstation 12 to RS 16.

As will be apparent to those skilled in the art, in systems where all or part of the FDS's 20 report directly to RS 16, the server at these FDSs could be programmed in the same manner. Optionally, since such a connection would typically be landline, each transaction could be transmitted directly to RS 16 as it occurred.

Figure 17B:
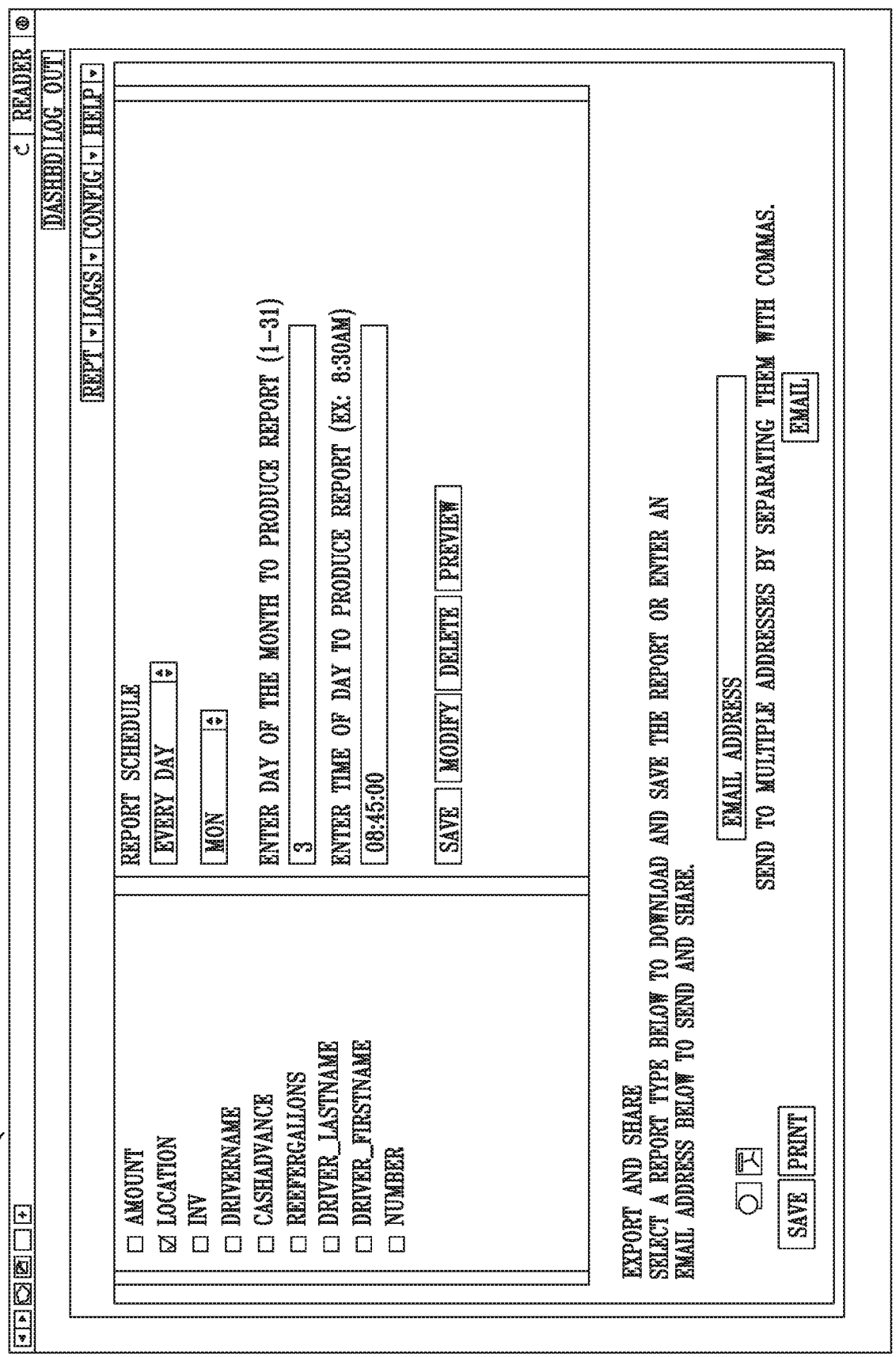

A Report Configuration form 256, exemplified by FIGS. 17A and 17B, enables a user to configure customized reports, including the content thereof, using data collected and stored by the system 10. Such reports may preferably be generated on an ad hoc basis or may be scheduled to be generated on a recurring basis.

An Alerts Configuration form 258, exemplified by FIGS. 18A and 18B, enables a user to configure instant notifications, or alerts. A user preferably has the option to configure at least fuel loss and/or temperature alerts which can be sent to the user, such as by way of email or SMS (e.g., text) message. Alerts may be grouped by units (e.g., tractors 24) and sent to one or more email or SMS recipients, including, by way of example but not limitation, the workstation 12 and the OCA 102 of the subject tractor 64, which OCA could display the alert on the tractor's dashboard and/or instrument panel (e.g., by illuminating the fuel gauge light).

A Product Configuration form 260, exemplified by FIG. 19, enables a user to configure different product types of fuel sensor 104. This form enables a user to set a product code and description for each product type which is then used to further group and configure individual fuel sensors.

A Firmware Updates form 262, exemplified by FIG. 20, enables firmware updates to fuel sensors to be sent globally to fuel sensor assemblies 100.

The help module 234 includes About Us function 264 and a Help Menu function 266 which provide various types of support to the user. Such functions are considered to be well known in the art and so will not be discussed further herein.

The instant notification module 236 includes Email form 268 and SMS form 270 which enable a user to configure how emails and text messages are sent, preferably in real time. By way of example, but not limitation, such an email to display 13 or text to a cell phone may be sent in step 524 of the process depicted by flow chart 500 of FIG. 5, or when a fuel loss event has been identified.

It should be appreciated that although particular flow diagram architectures are shown and described in connection with FIGS. 5A and 5B, other architectures are within the teachings presented herein. By way of example and not limitation, additional modules may be included. For example, a data input configuration module may be included to provide further capabilities to a user to set-up data inputs, which will allow various reconciliations to occur. Various fuel data and purchase data functions may be configured. Specific software handling characteristics such as file handling, parsing, and file formatting may be handled by a given module. Mapping functionality may be incorporated into the various modules presented herein such that information is overlaid onto a map.

It can be appreciated that RS 16 is able to accumulate substantial data from the system 10, whether partially generated initially within FSA 100 or mostly generated within server 16, about travel between various routes between points, such as cities. Such data may include vehicle performance, such as average miles/gallon, average speed, and average travel time. Data about the various routes may also include current price/gallon of fuel at various fueling locations. With this data, RS 16 may propose an optimized route based on an optimization characteristic or a weighted combination of characteristics, such as length of route, time to travel a route, and the cost and quality of fuel along a respective route, as exemplified below with respect to FIG. 21. Additionally, RS data may be used to provide a database of all fuel and travel data from a fleet of tractors. For example, if a user (e.g., an auditor, manager, attorney) needs to research characteristics of a truck at a given point in time, the database could be searched for that information (e.g., fuel level, GPS location, temperature of the fuel, and truck characteristics such as MPG, mileage, and the like). Likewise, the RS database also stores all the fuel purchase reconciliation data which may be of use to an auditor who performs quarterly or yearly audits on fuel purchases.

FIG. 21 exemplifies one scenario of a fuel optimization application of RS 16 of system 10. Tractor 24, employing the systems and processes presented herein, is hauling a load 26. As shown, city 384, fueling location 386, city 388, city 390, city 392, fueling location 20, and fueling location 22 are interconnected by highways 394, 396, 398, 400, 402, 404, 406, 408, 410, and 412. The transportation carrier frequently has tractors hauling freight on the route between city 384 and city 390. As a result, RS 16 has collected data about the various routes between city 384 and city 390. For example, one route may be city 384, which is the origin, on highway 394 to fueling location 386, on highway 396 to city 388, and on highway 398 to city 390, which is the destination. Another route may be city 384 on highway 404 to fueling location 20 on highway 402 to city 392, and on highway 400 to city 390, which is the destination. Yet another route may be to city 384 on highway 406 to fueling location 22, on highway 412 to city 392, and on highway 400 to city 390. While there are thus a number of routes that could be taken, using data that RS 16 has accumulated, an optimized route may be proposed for tractor 24 hauling freight 26 from city 384 to city 390 based, for example, on the price/gallon of fuel or, if the quality of the fuel is known, the price per BTU (British Thermal Unit). Therefore, as shown, tractor 24 utilizes highway 404, fueling location 20, highway 402, and highway 400 to city 390.

FIG. 22 depicts a side view of the tank 64 described above and configured for storing fluid 1001, such as fuel, such as diesel fuel or gasoline. Except as described herein, tank 64 is generally a conventional fuel tank, including a fuel supply line 96 extending from an outlet 98 to an engine (not shown) and, for fuel such as diesel fuel, a fuel return line 94 entering an inlet 92. To the extent that tank 64 is a conventional tank, it will not be described in further detail herein, except to the extent deemed necessary to describe the invention.

As shown by way of a broken-away portion of a side wall of tank 64, an opening 1016 is formed in the top of tank 64. A cylinder 1002 extends through opening 1016. Cylinder 1002 includes a ring plate 1020 configured for extending across opening 1016 and supporting cylinder 1002 in tank 64. Plate 1020 is preferably secured to tank 64 in any conventional manner, such as by fasteners, such as screws and/or bolts, or welding, and preferably with a gasket to act as a seal effective for preventing leakage of fluid 1001 from within the tank. Cylinder 1002 is preferably configured with vent holes 1003 for equalizing pressure between the interior and exterior of tank 64 as fuel volume changes and/or as altitude and atmospheric pressure changes. A tube 1004 extends through cylinder 1002, and sensor 104 is attached to a lower end of the tube to thereby position sensor 104 in fluid 1001.

As shown in FIG. 23, pressure sensor 104 is preferably a differential pressure sensor having electrical circuitry 150 including a processor 152 and a memory 154 effective for storing computer program code executable by processor 152. As is known by those skilled in the art, differential pressure sensors are available on the market with not only a processor and memory, such as illustrated, but may optionally also include a temperature sensor and heater (not shown). When a temperature sensor and heater are included, processor 152 is programmed to activate the heater to maintain at least a minimum operating temperature of sensor 104, including pressure detector 112, whenever the temperature of the fluid being measured drops below a given value to eliminate at least pressure sensing problems that may occur if the fluid is proceeding toward a solidified state. A bus 160 is provided which couples together processor 152 and memory 154, as well as an input/output ("I/O") 156. Sensor 104 further includes a pressure detector 112 and, optionally, a temperature detector 138, both of which detectors are coupled to processor 152 and memory 154 via I/O 156 and bus 160. Processor 152 is effective for receiving signals from pressure detector 112 and, optionally, temperature detector 138, and generating signals indicative of pressure and temperature, respectively, onto I/O 160, for transmission via respective electrical signal lines 1010 and 1012 to OCA 102, which transmits the signals to RS 16 for use in step 506 of the process 500 depicted in FIG. 5A or process 556 of FIG. 5B. It is noted that the term "sensor" as used herein may comprise a single detector or multiple detectors.

Sensor 104 preferably also includes a vent line 1014, which runs through tube 1004 (FIG. 24) and outside tank 64 to a dry box 1018 for communicating atmospheric pressure to sensor 104. In one embodiment, as discussed above, sensor 104 is a differential pressure sensor. It is well known that differential pressure sensors are effective for measuring the difference between two pressures, one connected to each side of the sensor, and therefore will not be described in further detail herein except insofar as necessary to describe the invention. Accordingly, fuel pressure is connected to one side of the differential pressure sensor and atmospheric pressure is connected to the other side of the differential pressure sensor. The differential pressure sensor then generates a signal to processor 152 indicative of the fuel pressure less the atmospheric pressure. Effectively, then, measured fuel pressure is simultaneously and continuously adjusted by atmospheric pressure, so that processor 152 does not need separately to account for the effects of atmospheric pressure on the pressure of fluid 1001 in the tank 64 when determining volume. Thus, in the embodiment illustrated, the pressure indicative signal output by the sensor 104 is always compensated for the effects of changing atmospheric pressure applied to the surface of the fluid in the tank regardless of geographic altitude and changes in the weather affecting barometric pressures.

As will be realized, the calculation of volume by the processor is also obtainable by using a fluid pressure signal received from a fluid pressure sensor such as 104, and using a processor (e.g., 152 or 172) to adjust (i.e., reduce) the value of that fluid pressure signal by an amount indicative of an atmospheric pressure signal received from another source, either inside or outside of tank 64, before volume is determined by processor 152 or, alternatively, by a processor outside of tank 64, such as processor 172 (FIG. 4).

It may be appreciated that fluid 1001 in a moving tractor 24 will slosh around, vibrate, and move from one end of tank 64 to the other as the angle of the tractor changes, such as when traveling up or down an incline, such as a hill. As fluid 1001 moves, the pressure sensed by pressure detector 112 may fluctuate, potentially resulting in erroneous measurements. To dampen such fluctuations, a mesh buffer 113 is preferably incorporated in pressure detector 112 by being positioned in or over the input port of the pressure detector 112. A mesh buffer preferably comprises a soft, porous material such as cellulose wood fibers, foamed plastic polymers, or the like.

Dry box 1018 includes desiccant to aid in absorbing moisture and keeping air in vent line 1014 dry so that atmospheric pressure may be accurately communicated. Dry box 1018 may be located in any suitable place that is convenient and protected from water in the environment, such as precipitation (e.g., rain) and water that splashes up from a roadway. Dry box 1018 may, for example, be located in cab 48 and/or integrated with OCA 102 (which may also be located in cab 48).

Sensors that detect pressure and temperature are considered to be well-known and commercially available from manufacturers, and so will not be described in further detail herein, except insofar as necessary to describe the invention.

As shown most clearly in FIG. 24, in a cross-section of tube 1004 taken along line 24-24 of FIG. 22, tube 1004 carries the lines 1010 and 1012 as well as the vent line 1014. As shown in FIG. 22, the tube 1004 extends through cylinder 1002 to the exterior of tank 64. Outside of tank 64, electrical signal lines 1010 and 1012 are preferably carried with the data communication link or tube 120 in any suitable manner, such as by way of split loom tubing, to processor 172 of OCA 102. In one embodiment, depicted by FIG. 22, outside the tank 64, vent line 1014 is separated from tube 120 carrying electrical signal lines 1010 and 1012, and is directed to dry box 1018. In an alternative embodiment, dry box 1018 is integrated with OCA 102 and vent line 1014 is carried by tube 120 with signal lines 1010 and 1012 to dry box 1018 in OCA 102.

In a preferred embodiment of the invention, a compensatory pressure sensor 1005 is positioned above sensor 104 by a space 1009 to more precisely determine density (or an analogue thereof) to thereby obviate errors that may result from a change in density due to, for example, varying grades of fuel, water from condensation or fraud or the effects of temperature on fluid 1001. Additional electrical signal lines 1010 (not shown) are preferably provided from compensatory pressure sensor 1005 to processor 152 for processing and then transmission via bus 160 and I/O 156 to OCA 102. Alternatively, additional electrical signal lines 1010 may be provided for carrying signals from sensor 1005 in tube 120 to OCA 102. In the preferred embodiment, memory 174 in OCA 102 is preferably provided with computer program code for comparing the pressure measured by pressure detector 112 and the pressure measured by compensatory pressure sensor 1005, and determining a difference, or delta pressure. The delta pressure may be used to determine density (or an analogue to density) of fluid 1001, and thereby determine more precisely, with the pressure measured from pressure detector 112, the height of fluid in tank 64, from which height the volume of fluid in tank 64 may be determined. In one embodiment of the invention, such calculation may be made using the following variables:

W_comp=compensated liquid weight value per inch of liquid

Figure 26:
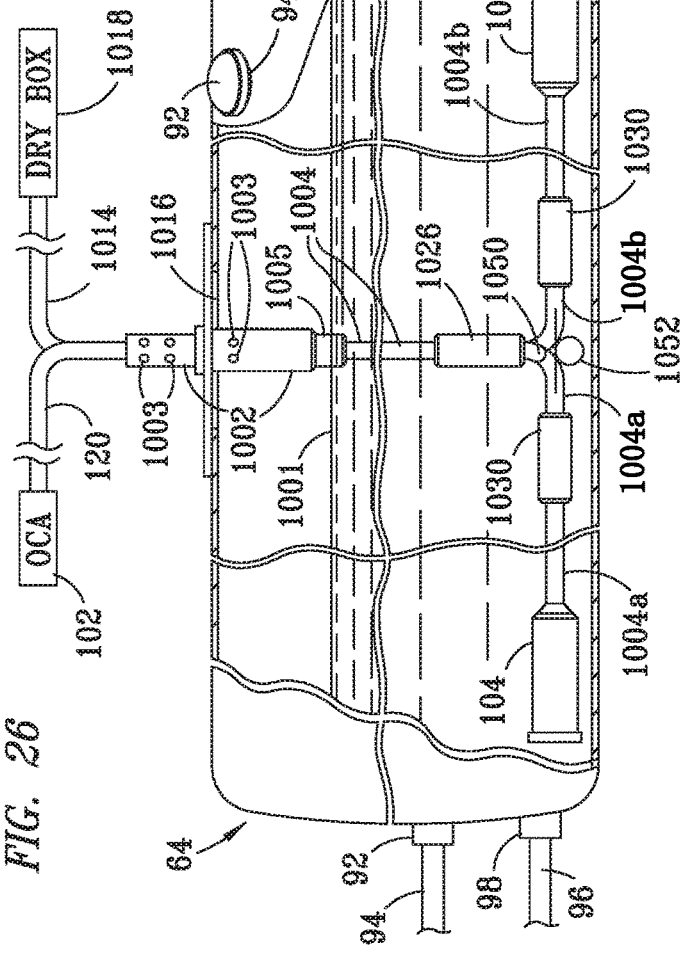
FIG. 26 illustrates the dual fuel volume sensor of FIG. 25 inserted in a fuel tank of the tractor of FIG. 3.

C_distance=compensation distance setting, designated by reference numeral 1009 in FIGS. 22 and 26.

T_distance=calculated total liquid height in tank.

P_primary=pressure reading from primary sensor, exemplified by sensor 104

P_comp=pressure reading from compensating pressure sensor 1005.

The above variables may then be used in the following equations to calculate T:

W_comp=(P_primary−P_comp)/C_distance
T_distance=P_primary/W_comp

Exemplifying with specific values, such as P_primary=5 psi, P_comp=3 psi, and C_distance=4 inches, then:

W_Comp=5 psi−3 psi/4 inch=0.5 psi per inch
T_distance=5 psi/0.5 psi=10 inches of liquid in the tank.

It is considered that such equations to effectuate such calculations and determinations would be apparent to a person having ordinary skill in the art upon a reading of the present description herein, and so will not be described in further detail herein. The density is preferably calculated only when tank 64 is filled up, and then stored in memory 154 until a subsequent fill-up or optionally a loss sufficient to trigger the determination of a fuel event, thereby avoiding errors in calculations when the level of fluid falls below the level of the compensatory pressure sensor 1005.

As noted above, pressure readings are subject to fluctuations due to a number of factors, for which a buffer mesh was disclosed for dampening the fluctuations. To further smooth the effects of pressure fluctuations and obtain still more accurate measurements, the pressure is preferably measured frequently (e.g., every 30 seconds) and a rolling average is generated, representing a more accurate measurement of fluid pressure and, hence, fluid volume, as discussed above with respect to steps 506-510 of the flow chart 500 of FIG. 5A or steps 556-560 in FIG. 5B.

To obtain further enhanced accuracy of fluid pressure and volume, particularly when fluid shifts from one end of tank 64 to the other, in an alternative embodiment of the invention, multiple pressure sensors are used proximate to the bottom of tank 64, and measurements from the multiple pressure sensors are averaged. Accordingly, FIG. 25 exemplifies an alternative embodiment of the invention in which two pressure sensors proximate to the bottom of the tank 64 are utilized, preferably in addition to the compensatory pressure sensor 1005, described above. In addition to pressure sensor 104, an additional sensor 1006 is utilized to measure fluid pressure, and hence, volume, more accurately. Sensor 1006 includes a pressure detector 1007 preferably substantially similar to pressure detector 112, and includes circuitry similar to circuitry 150 of FIG. 23. It is not necessary that sensor 1006 be provided with a temperature detector as the sensor 104 was optionally provided with the a temperature detector 138. However, if both sensors include temperature measurement, the two can also be averaged for more accuracy since temperature of fluid on one end of a container is not always identical with temperature at the other end. Pressure detector 1007 is preferably coupled to a processor via lines running through I/O and a bus, and then onto an additional set of electrical signal lines 1010 to OCA 102. In an alternative embodiment, all electrical signals indicative of pressure and/or temperature are combined by a single processor and transmitted via a single pair of lines to OCA 102 using conventional serial communication technology, as is well known in the art.

Further to the embodiment of FIG. 25, tube 1004 is replaced by an upper tube 1024, a splitter 1026, and two tubes 1004a and 1004b, with reinforcing tubing 1030, terminating in sensors 104 and 1006, respectively. Tubes 1004a and 1004b are preferably of dissimilar lengths so that sensors 104 and 1006, when together as shown in FIG. 25, maintain a smaller lateral (or horizontal) profile so that they may be passed more readily through opening 1016. A spring 1052 is preferably positioned on the two tubes 1004a and 1004b for spreading the two tubes apart, preferably by an angle of about 180°, as more clearly depicted in FIG. 26. In operation, when pressure measurements are desired, fluid pressure is measured from both pressure detectors 112 and 1007 and preferably averaged, and the average value is used, for example, in step 508 of FIG. 5A or step 560 of FIG. 5B, as well as in determining the density of the fluid 1001 in conjunction with the compensatory pressure detector, as discussed above. Operation of the embodiment of FIGS. 25-26 is otherwise similar to operation of the embodiment of FIGS. 22-24.

Figure 27:
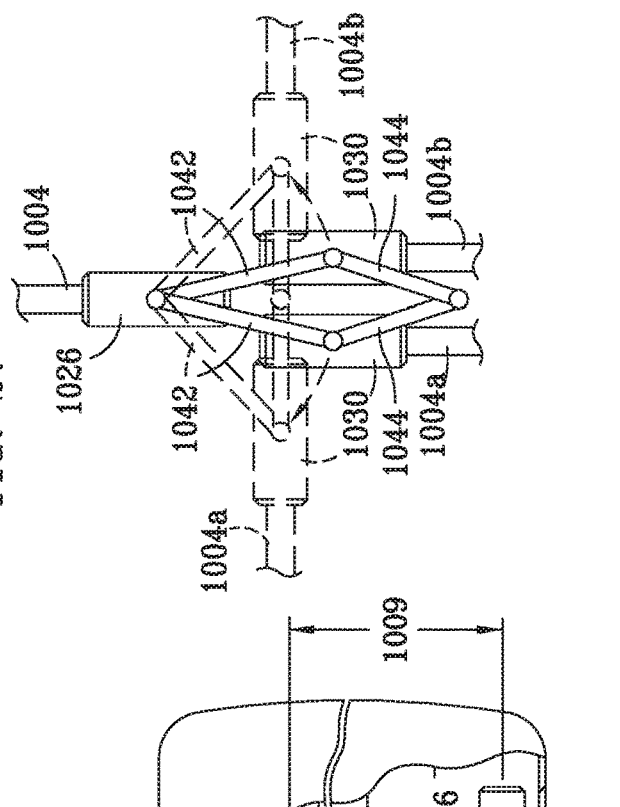
FIGS. 27 and 28 exemplify a mechanism that may optionally be employed to stabilize the dual fuel volume sensor of FIG. 25.
Figure 28:
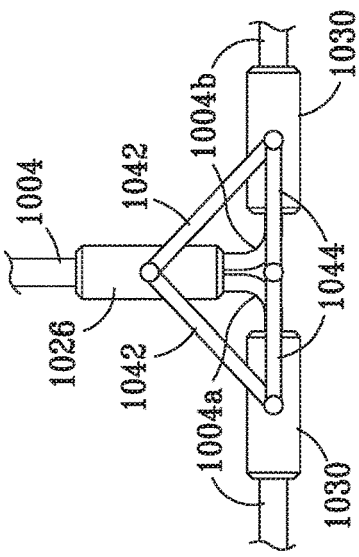

It may be appreciated that when tubes 1004a and 1004b, as well as sensors 104 and 1006, are spread apart, it would be desirable that they maintain a relatively constant position and orientation with respect to each other, to facilitate consistently accurate and reliable fluid pressure measurements. To that end, FIGS. 27 and 28 exemplify a subassembly of linkages 1042 and 1044 which are preferably adapted to the embodiment of FIGS. 25 and 26, pivoting on the splitter 1026 and each of reinforcing tubes 1030. FIG. 27 demonstrates how tubes 1004a and 1004b are substantially parallel, in solid outline, and move to a spread position in which tubes 1004a and 1004b are substantially collinear, in dashed outline. The latter position is shown in solid outline in FIG. 28.

It may be further appreciated that by knowing the depth (or height) of fluid 1001 in a tank 64, and the size and shape of a tank, the (measured) volume may be calculated in any of a number of different ways by OCA 102 processor 172, RS 16 processor 202, or any other suitable processor. By way of example but not limitation, the sensor 104 pressure output allows fluid volume to be calculated mathematically using well-known equations, given the size and shape of a tank for a given fluid depth. In another example, fluid volume may be calculated mathematically for a number of different fluid heights and a chart generated correlating height to volume; then a specific volume may be determined from the chart for any specific depth. In another example, volume amounts or values may be determined by manually pouring fluid into a tank, one unit (e.g., gallon) at a time, and measuring the pressure or depth with each unit added and generate a chart from that. In another example, if tanks can be categorized into a few fundamental shapes, the only variable being size, a chart may be generated for each category of shape, and scaled for the size of any particular tank of that shape. Volume may also be scaled or adjusted for the density and/or temperature (which affects density) of the fluid. It is considered that further details exemplifying such methods, as well as alternative methods, for determining volume of a fluid from variables, such as pressure or depth of the fluid in a tank and density of the fluid, would be apparent to a person having ordinary skill in the art, upon a reading of the description of the invention herein; therefore, it is deemed not necessary to discuss same in further detail herein.

As is well known, the amount of usable energy obtained from a given energy source is dependent upon multiple factors. For a liquid energy source such as diesel fuel, gasoline, propane, LNG, LPG, and so forth, the amount of usable energy available, such as BTU (British Thermal Unit) per volumetric unit, such as a gallon, is dependent upon not only the temperature of the liquid but also upon the quality of materials used to formulate that liquid. Both diesel fuel and gasoline may have additives mixed in with the primary fuel that are derived from other than refined petroleum. Examples may be grain alcohol such as ethanol from harvested corn as applied to gasoline as well as biofuel products recovered from oils or fats such as in cooking greases that are added to diesel fuel. These additives are utilized for multiple political and economic reasons; however, both of these additives reduce the usable energy (BTU) per gallon of the fuel as compared to the primary fuel without additives. However, diesel fuel as well as gasoline without additives will vary in usable energy per gallon depending on the well from which petroleum was derived, the manner in which it was processed in the refinery as well as to some extent the manner in which the fuel is stored before being used. Thus, every time a vehicle adds liquid fuel from a different energy source from previous refueling, the amount of usable energy per gallon in the fuel tank is likely to change.

From a trucking company's standpoint, it is important to have some comprehension of the amount of usable energy per gallon of fuel obtained from any refueling source such as a truck stop or gas station. From a driver's standpoint the amount of usable energy per gallon is important in determining how soon it will be necessary to add additional fuel to the vehicle. Thus, it is advantageous to be able to measure the quality of fuel obtained not only for the above reasons but to detect potential fraud occurring in the delivery of fuel to the vehicle fuel storage container. It is known that some fuel dispensing entities have engaged in a practice of heating the fuel to be dispensed to customers. The heated fuel expands substantially in volume thus lowering the usable energy BTUs available per received gallon of fuel. Thus, a customer receiving heated fuel is paying more per gallon of received fuel (i.e., more per BTU) than would be indicated or shown on the pump or invoice.

It would therefore be prudent, by determining the temperature of incoming fuel being received by the one or more fuel tanks of a truck, to initially at least generate a rough guesstimate of the usable energy being received at a given truck stop. If the source of a liquid fuel at that station is below ground level, as it is in most commercial refueling stations, and the temperature of the fuel being received is above temperatures normally recorded at that truck stop or at other similar truck stops, it would be desirable to generate an alert message to appropriate individuals for possible fraud. Even if the source of liquid fuel is above ground, a substantial rise in temperature of fuel in the truck fuel container upon receiving fuel would (or at least should) raise suspicions of fraud since the fuel container in the truck is typically subject to the same ambient temperature as a truck stop above ground source fuel container.

As mentioned elsewhere in the specification the one or more fuel sensors in a given fuel tank include temperature sensing capability and the recording of this temperature is shown in various figures such as FIG. 11. While an additional temperature sensor could be used to directly measure the temperature of incoming fuel $T_a$ to the vehicles fuel tank, the temperature of incoming fuel can reasonably accurately be determined by maintaining a record of the volume of fuel in the fuel tank and the temperature of that fuel before adding new fuel at a refueling station. Then the temperature of the fuel added $T_a$ may be calculated by the formula $T_a=(V_t*T_t-V_i*T_i)/(V_t-V_i)$ where $V_t$ is the total volume of fuel in the container after termination of incoming fuel, $T_t$ is the temperature of the total volume as measured after termination of incoming fuel, $V_i$ is the initial volume measured before fuel is added and $T_i$ is the temperature of the initial volume of fuel before fuel is added. While the calculated temperature density may not be exactly identical to the temperature of the fuel as it passes through the measuring device in the fuel dispensing machine due to ambient temperatures affecting the contents of the vehicle fuel tank, it is close enough to ascertain whether or not fraud is involved and may be used to provide an initial indication to the vehicle driver or to other appropriate authorities how much usable energy is now available to operate the vehicle.

Once the vehicle is again moving on the highway the miles per gallon may again be computed for the vehicle utilizing the combined fuel quantities compared to the miles per gallon detected prior to adding fuel. This information may be used to obtain an even more accurate determination of the quality of the fuel obtained from the just used truck stop in a manner similar to that used above to obtain the temperature of the fuel added. Thus, over a period of time the accumulated information as to fuel quality from various refueling stations can be used to determine which stations to avoid for reasons either of fuel quality or potential fraud.

Other energy sources that may be available for use by transportation vehicles may also have shortcomings relative to consistent quality usable energy from an energy supplier. The wireless transfer of electrical energy through electromagnetic means to a vehicle requiring additional energy is believed to be affected by not only other electromagnetic transmissions in the vicinity of the vehicle but also by weather conditions existing at the time of attempted transfer.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

The invention claimed is:

1. A system for determining volume of liquid in at least one tank, the system comprising:
    at least one tank capable of storing liquid;
    at least one differential pressure sensor positioned within the at least one tank, and submersed in the liquid when liquid is in the at least one tank, the at least one differential pressure sensor being configured for sensing a liquid pressure equal to the pressure of liquid proximate to the at least one differential pressure sensor;
    at least one vent line operatively connected to the at least one differential pressure sensor, the at least one vent line having an end through which changing atmospheric pressure may be continuously communicated to the at least one differential pressure sensor, the at least one differential pressure sensor being configured for generating, while submersed in the liquid, an analog differential pressure measurement signal indicative of the liquid pressure less the changing atmospheric pressure, wherein the liquid pressure and the changing atmospheric pressure are sensed continuously and simultaneously with each other;
    at least one first processor constituting a portion of the at least one differential pressure sensor submersed in the liquid, wherein the at least one first processor is operable for generating from the analog differential pressure measurement signal a digital differential pressure measurement signal; and
    an onboard computer assembly ("OCA") in signal communication with the at least one processor, the OCA comprising at least one second processor operable for receiving from the at least one first processor the digital differential pressure measurement signal, and determining, with reference to the digital differential pressure measurement signal, a volume of liquid in the at least one tank.

2. The system of claim 1, further comprising a mesh buffer positioned on an input port of the at least one differential pressure sensor.

3. The system of claim 1 wherein the at least one differential pressure sensor is also configured for measuring temperature of the liquid and generating a signal indicative of the temperature to ascertain whether a liquid frost or freeze event could occur.

4. The system of claim 1 wherein the memory further includes computer program code executable by the at least one processor for storing in the memory datum indicative of the volume of liquid in the at least one tank.

5. The system of claim 1 further comprising:
    a transmitter coupled to the at least one processor and configured for transmitting data signals to a remote server (RS); and
    wherein the memory includes computer program code executable by the at least one processor for causing the transmitter to transmit to the RS the data signals indicative of the volume of liquid in the at least one tank.

6. The system of claim 1 wherein the at least one differential pressure sensor also includes a temperature sensor and a heater communicatively coupled with the at least one processor and is configured for measuring temperature of the liquid and activating the heater when the measured temperature of the liquid is less than a predetermined value.

7. The system of claim 1 wherein the memory includes computer program code executable by the at least one processor for storing in the memory the determined volume of liquid in the at least one tank.

8. The system of claim 1 wherein the at least one processor is an at least one first processor and the memory is a first memory, the system further comprising:
    a transmitter configured for transmitting data signals to a remote server (RS) and communicatively coupled to the at least one processor; and
    wherein the first memory includes computer program code executable by the at least one processor for:
        determining the volume of liquid with reference to the pressure and the density of the liquid; and
        causing the transmitter to transmit the liquid volume signals to the RS, the RS including at least one second processor and a second memory coupled to the second processor for executing computer program code for determining if liquid volume has changed more than a predetermined threshold and for recording the volume subsequent to the change if it is determined that liquid volume has changed more than the predetermined threshold.

9. The system of claim 1 wherein the system further comprises:
   at least one first pressure sensor configured for measuring the pressure of the liquid proximate the at least one first pressure sensor and communicating signals indicative of same to the at least one processor;
   at least one second pressure sensor positioned higher in the at least one tank by a predetermined space than the at least one first pressure sensor, the at least one second pressure sensor being configured for measuring the pressure of the liquid and communicating signals indicative of same to the at least one processor; and
   wherein the memory includes computer program code executable by the at least one processor for determining the density of the liquid with reference to the pressure measured by the at least one first pressure sensor and the pressure measured by the at least one second pressure sensor.

10. The system of claim 1 further comprising:
    a dry box attached to the at least one vent line to aid in absorbing moisture and keeping air in the at least one vent line dry.

11. The system of claim 1 further comprising a dry box coupled in fluid communication to the at least one differential pressure sensor to aid in absorbing moisture and keeping air communicated to the at least one sensor dry.

12. The system of claim 1 wherein the at least one tank is mounted on a vehicle.

13. The system of claim 1 wherein the at least one vent line has a single end through which air may flow and atmospheric pressure may be communicated to the at least one sensor.

14. The system of claim 1 wherein the computer program code in the memory is executable by the at least one processor for determining the volume of liquid with reference to the pressure measurement and density of the liquid and in accordance with the size and shape of the at least one tank.

15. The system of claim 1 further comprising:
    a transmitter communicatively coupled for receiving data signals from the at least one processor, mounted on the vehicle, and configured for transmitting data signals to a remote server (RS); and
    wherein the memory includes computer program code executable by the at least one processor for:
       determining the volume of liquid with reference to the pressure measurement and the density of the liquid; and
       causing the transmitter to transmit data signals indicative of the volume of liquid to the RS, the RS being configured for receiving and processing the data signals.

16. The system of claim 1 further comprising:
    a transmitter, configured for transmitting data signals to a remote server (RS), the transmitter being coupled to the at least one processor of the at least one differential pressure sensor; and
    wherein the memory includes computer program code executable by the at least one processor for
       determining the volume of liquid with reference to the pressure measurement and the density of the liquid; and
       causing the transmitter to transmit data signals indicative of the volume of liquid to the RS, the RS including a further processor and a second memory coupled to the further processor for executing computer program code for determining if liquid volume has changed more than a predetermined threshold and for generating an alert if it is determined that liquid volume has changed in volume more than the predetermined threshold.

17. The system of claim 1 further comprising:
    a transmitter, configured for transmitting data signals to a remote server (RS), the transmitter being communicatively coupled to the at least one processor of the at least one differential pressure sensor; and
    wherein the memory includes computer program code executable by the at least one processor for
       storing each datum indicative of a determined volume of liquid in memory;
       determining if liquid volume has changed by more than a predetermined threshold;
       if it is determined that liquid volume has changed by more than the predetermined threshold, then generating an alert and causing the transmitter to transmit an indication of the alert to the RS.

18. The system of claim 1 further comprising:
    a transmitter, configured for transmitting data signals to a remote server (RS), the transmitter being coupled to the at least one processor of the at least one differential pressure sensor; and
    wherein the memory includes computer program code executable by the processor for:
       storing in the memory datum indicative of the volume of liquid with reference to the pressure measurement of the liquid; and
       causing the transmitter to transmit data signals indicative of at least one of the determined volume of liquid stored in memory and/or an alert when it has been determined that liquid volume has changed in volume by more than a predetermined threshold.

19. The system of claim 1 further comprising:
    at least one first pressure sensor positioned in the at least one tank and configured for generating to the at least one processor a first pressure signal indicative of the pressure of liquid proximate to the at least one first pressure sensor;
    at least one second pressure sensor positioned higher in the at least one tank by a predetermined space than the at least one first pressure sensor, the at least one second pressure sensor being configured for generating to the at least one processor at least one second pressure signal indicative of the pressure of liquid proximate to the at least one second pressure sensor; and
    wherein the memory includes computer program code executable by the at least one processor for:
       determining the density of the liquid with reference to the pressure measured by the at least one first pressure sensor and the pressure measured by the at least one second pressure sensor; and
       determining the volume of fluid with reference to the pressure measured by the at least one first pressure sensor and the determined density of the liquid in the tank.

20. The system of claim 1, further comprising a mesh buffer positioned on the input port of the at least one differential pressure sensor, wherein the mesh buffer comprises cellulose wood fibers.

21. The system of claim 1, further comprising a mesh buffer positioned on the input port of the at least one differential pressure sensor, wherein the mesh buffer comprises foamed plastic polymers.

22. A method for determining volume of liquid in a tank, the method comprising steps of:
- storing liquid in a tank;
- positioning a differential pressure sensor in the liquid proximate to the bottom of the tank;
- measuring, via the differential pressure sensor, liquid pressure proximate the bottom of the tank;
- measuring, via the differential pressure sensor, atmospheric pressure continuously and simultaneously with the step of measuring liquid pressure;
- determining, via the differential pressure sensor, the differential pressure between the liquid pressure and the atmospheric pressure measured continuously and simultaneously with each other;
- generating, via a processor constituting a portion of the differential pressure sensor submersed in the liquid, digital signals indicative of the differential pressure;
- communicating the digital signals to an onboard computer assembly ("OCA"); and
- calculating by the OCA, with reference to the digital signals, the volume of liquid in the tank.

23. The system of claim 1 wherein the at least one first processor is at least one application-specific integrated circuit ("ASIC").

24. The system of claim 1 wherein the at least one first processor is at least one electronic data processor.

25. The system of claim 1 wherein the at least one first processor is at least one of a microprocessor, a controller, and a microcontroller.

26. The method of claim 22 wherein the processor is an application-specific integrated circuit ("ASIC").

27. The method of claim 22 wherein the processor is an electronic data processor.

28. The method of claim 22 wherein the processor is at least one of a microprocessor, a controller, and a microcontroller.

* * * * *